(12) United States Patent
Craner

(10) Patent No.: US 9,077,934 B2
(45) Date of Patent: Jul. 7, 2015

(54) SYSTEMS AND METHODS FOR DETECTING INCONSISTENT USER ACTIONS AND PROVIDING FEEDBACK

(75) Inventor: Michael Craner, Chester Springs, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 459 days.

(21) Appl. No.: 13/444,173

(22) Filed: Apr. 11, 2012

(65) Prior Publication Data

US 2012/0210347 A1 Aug. 16, 2012

Related U.S. Application Data

(62) Division of application No. 12/269,639, filed on Nov. 12, 2008, now Pat. No. 8,176,510.

(51) Int. Cl.
| | |
|---|---|
| H04N 7/173 | (2011.01) |
| H04N 5/445 | (2011.01) |
| H04N 21/258 | (2011.01) |
| H04N 21/442 | (2011.01) |

(Continued)

(52) U.S. Cl.
CPC ....... *H04N 5/44582* (2013.01); *H04N 7/17318* (2013.01); *H04N 21/25875* (2013.01); *H04N 21/25891* (2013.01); *H04N 21/44222* (2013.01); *H04N 21/4532* (2013.01); *H04N 21/4622* (2013.01); *H04N 21/4751* (2013.01); *H04N 21/4753* (2013.01); *H04N 21/4755* (2013.01); *H04N 21/478* (2013.01); *H04N 21/6547* (2013.01); *H04N 21/812* (2013.01)

(58) Field of Classification Search
CPC .......... H04N 21/254; H04N 21/25808; H04N 21/25866; H04N 21/6332
USPC .......................................... 725/13, 23, 24, 37
See application file for complete search history.

(56) References Cited

U.S. PATENT DOCUMENTS

| | | | |
|---|---|---|---|
| 2003/0115592 A1 | 6/2003 | Johnson | |
| 2004/0073924 A1 | 4/2004 | Pendakur | |

(Continued)

FOREIGN PATENT DOCUMENTS

| | | |
|---|---|---|
| WO | WO-98/26584 A1 | 6/1998 |
| WO | WO-03/051051 A1 | 6/2003 |
| WO | WO-03/055215 A1 | 7/2003 |

OTHER PUBLICATIONS

International Search Report dated Apr. 22, 2010 in corresponding International Application No. PCT/US2009/006097.

*Primary Examiner* — Dominic D Saltarelli
(74) *Attorney, Agent, or Firm* — Ropes & Gray LLP

(57) ABSTRACT

Systems and methods are provided for detecting inconsistent user actions and providing feedback about assets. A user may perform a first action restricting access to a first asset. The system may detect whether a second action performed relative to a second asset that has a similar attribute as the first asset is inconsistent with the first asset. The inconsistency may be detected when the second action removes or is an inaction that does not place access restrictions on the second asset. The system may alert the user about the inconsistency and the user may act on the alert by providing feedback about the inconsistency and/or the first/second asset, ignoring the inconsistency and/or placing an access restriction or other action consistent with the first action relative to the second asset. The user may also provide detailed feedback about an inconsistency or asset through a website accessed on another device.

26 Claims, 16 Drawing Sheets

(51) Int. Cl.
*H04N 21/475* (2011.01)
*H04N 21/81* (2011.01)
*H04N 21/45* (2011.01)
*H04N 21/462* (2011.01)
*H04N 21/478* (2011.01)
*H04N 21/6547* (2011.01)

(56) References Cited

U.S. PATENT DOCUMENTS

2004/0255321 A1   12/2004  Matz
2008/0140491 A1*  6/2008  Jain et al. .................... 705/8
2009/0055856 A1   2/2009  Christian

* cited by examiner

900

Asset Data Structure

910 <title> "Family Guy" </title>
<channel> 7 </channel>
<broadcast> 8-9 PM </broadcast>
920 <VOD> Yes </VOD>
<Rating> TV-PG </Rating>
<sub-rating> PG-13</sub-rating>
<feedback> NO </feedback>
<status> watched </status>
<series> Yes </series>
<genre> comedy </genre>
<sub-category> cartoon </sub-category>
<website> www.familyguy.com </website>
<service> linear </service>
930 <shares_atts_with_prog1> simpsons_41572 </shared_atts_with_prog1>
         932  934

⋮

<director> Lucas </director>
<description> "Stewie goes to jail" </description>

FIG. 9

SYSTEMS AND METHODS FOR DETECTING INCONSISTENT USER ACTIONS AND PROVIDING FEEDBACK

CROSS-REFERENCE TO RELATED APPLICATIONS

This application is a division of U.S. patent application Ser. No. 12/269,639, filed Nov. 12, 2008 now U.S. Pat. No. 8,176,510. The aforementioned prior application is hereby incorporated herein by reference in its entirety.

BACKGROUND OF THE INVENTION

The invention is directed to systems and methods for using an interactive media guidance application, and more particularly to using the interactive media guidance application to detect inconsistent user actions and provide feedback.

Conventional television equipment devices allow users to perform actions relative to programs provided through the television equipment that, for example, restrict access to the programs or remove access restrictions from the programs. The user may desire to restrict access to a particular program because, for example, the rating of the program exceeds a tolerance level of a user. The terms "restrict access" may be used interchangeably below with the term "lock" and the term "remove access restrictions" may be used interchangeably with the term "unlock".

Although the user performs the restriction access action relative to the particular program, there may be other programs, potentially unknown to the user, that have similar undesirable characteristics (e.g., unsuitable content) that might also exceed the tolerance level of the user. The user may perform actions relative to these other programs that are inconsistent with the restriction access action performed relative to the particular program. For example, the user may remove access restrictions or not restrict access from/to programs that have the undesirable characteristics of a particular program. However, conventional television equipment devices do not determine that inconsistent actions are performed. Accordingly, the user is not informed about the existence of these other programs that may have undesirable characteristics (or about any inconsistent actions) and may therefore be exposed to unsuitable or undesirable content.

Additionally, a user may be dissatisfied or offended by a particular program's rating or subject matter. However, there is no easy way for the user to express his/her disagreement or disapproval with the rating, content or quality of the program to the media provider or program sponsor(s). Thus, the media provider will unknowingly continue to provide the inappropriate or offensive program and/or the reputation of the sponsor may be damaged because the sponsor may be potentially unknowingly associated with the inappropriate and/or offensive subject matter.

Accordingly, it is desirable to provide enhanced systems and methods for detecting inconsistent user actions and providing feedback.

SUMMARY OF THE INVENTION

In accordance with the principles of the present invention, systems and methods are provided for detecting inconsistent user actions and providing feedback about assets.

In some embodiments, a user may perform a first action relative to a first asset. The first action may be in the form of a lock or access restriction placed on an attribute (e.g., a rating or title) of an asset. A second action may be performed relative to a second asset which has a similar attribute as the first asset. The second action may be in the form of an inaction (e.g., not locking or not placing access restrictions) on the second asset. In some implementations, the second action may be an update to the program listings of the program guide which changes an attribute of the second asset or adds an asset to the program listings. The attributes which are similar between the first and second assets may be a rating. In some embodiments, the user may instruct the system to search for assets having attributes similar to those of the first asset to determine whether inconsistent actions are present. In some implementations, such a search may be performed automatically by the system.

The system may detect that actions performed relative to the first and second assets are inconsistent. In particular, the system may analyze asset data structures of the first and second assets and determine whether a first action (e.g., an access restriction placed on the first asset) is inconsistent with a second action (e.g., a lack of an access restriction placed on the second asset or removal of access restrictions). For example, since the assets share attributes, the user may have locked the first asset because of a certain attribute (e.g., a rating) but failed to lock another asset which has a similar attribute (e.g., the same or higher rating).

The system may alert the user about the inconsistency. For example, the system may provide a prompt indicating the first action performed relative to the first asset is inconsistent with an action (or inaction) performed relative to the second asset. In particular, the system may alert the user that a first asset has been locked and a second asset which has a similar attribute has not been locked. The user may choose to lock the second asset, ignore the alert, or provide feedback about the inconsistency and the first/second asset. In some implementations where the user interface limits efficient input of text (e.g., a set-top box and its remote control), the feedback may be provided by selecting various radio buttons or checkboxes.

In some embodiments, the user may select an option to provide more feedback or detailed feedback. Detailed feedback (e.g., feedback that includes textual input) may be provided through a website. In particular, a first user device may transmit to a computer an electronic communication (e.g., a feedback request) that includes information identifying the user and the asset for which the user desires to provide feedback. The computer may be a host for a website of which the user is a member. The computer may store the feedback request in a memory by, for example, adding the feedback request as an entry to a feedback queue.

The user may log onto the website hosted by the computer through a second device. The computer may detect the presence of feedback request entries in the feedback queue or memory that are associated with the user. The computer may retrieve one or more of the feedback request entries and provide the feedback request(s) to the second device. The user may be prompted at the second device to provide feedback about the asset associated with a particular feedback request entry at the second device through the website. The user may provide detailed feedback about the asset by selecting various feedback options (including textual input fields) in a website form. The feedback may be provided to the media provider of the asset and/or to any sponsors or advertisers associated with the asset.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 9 shows an illustrative asset data structure in accordance with an embodiment of the present invention;

DETAILED DESCRIPTION

Figure 1:
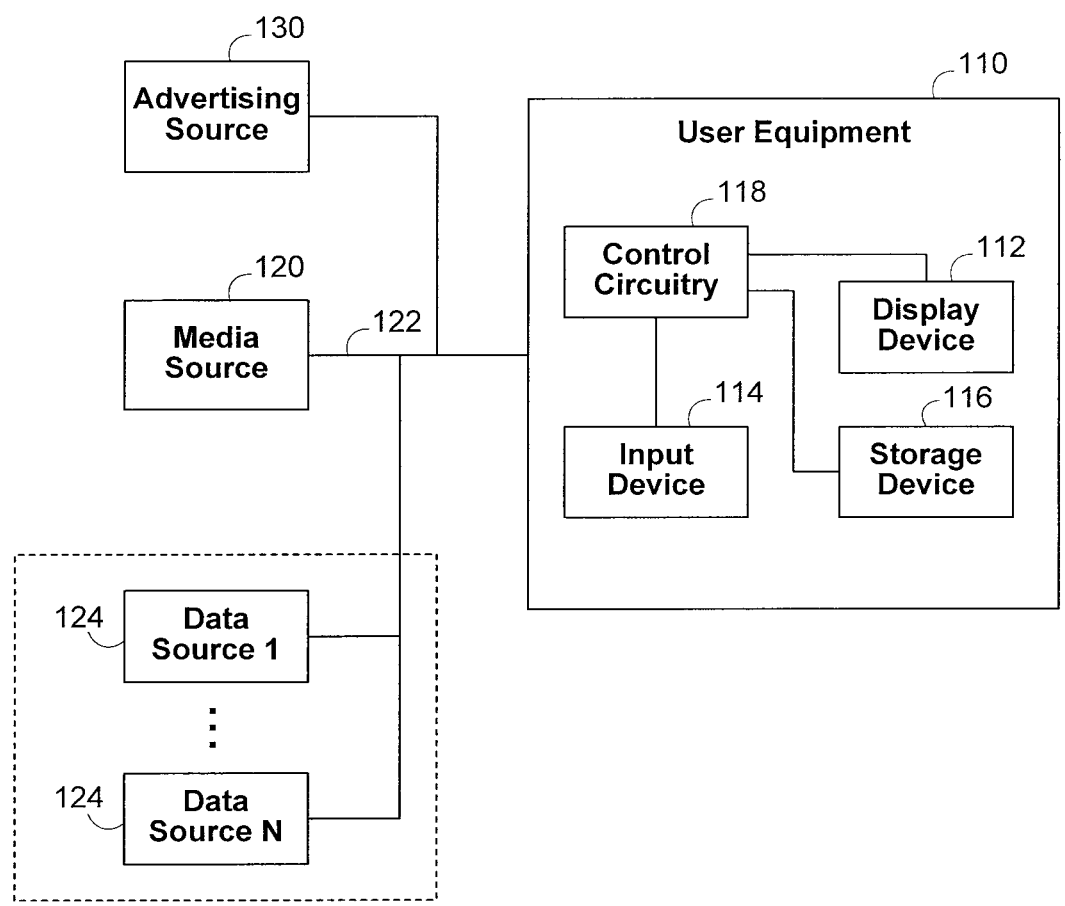
FIG. 1 is a diagram of an illustrative interactive television system in accordance with an embodiment of the present invention.

FIG. 1 shows illustrative interactive media system 100 in accordance with an embodiment of the invention. User equipment 110 receives content in the form of signals from media source 120 over communications path 122. In practice there may be multiple media sources 120, advertising sources 130 and user equipment 110, but only one of each has been shown in FIG. 1 to avoid over-complicating the drawing.

Media source 120 may be any suitable media source such as, for example, a cable system headend, satellite media distribution facility, media broadcast facility, on-demand server (e.g., VOD server), game service provider (e.g., for online gaming), Internet service provider (e.g., for providing Websites), an ordered list provider (e.g., for providing playlists), an asset provider (e.g., for providing assets or asset characteristics or attributes) or any other suitable facility or system for originating or distributing content. Media source 120 may be configured to transmit signals over any suitable communications path 122 including, for example, a satellite path, a fiber-optic path, a cable path, an Internet path, or any other suitable wired or wireless path. The signals may carry any suitable content such as, for example, television programs, games, music, news, and/or web services. In some embodiments, media source 120 may include control circuitry for executing the instructions of an interactive media guidance application such as, for example, a client/server or online interactive media guidance application.

Advertising source 130 may be any sponsor or advertising entity that generates media and/or content that attracts users to specific products/companies, informs users about specific products/companies and/or promotes specific products/companies. Advertising source 130 may be implemented as part of media source 120, data source 124 or as a separate entity. Advertising source 130 may supply advertising content to media source 120 and/or user equipment 110 through link 122. The advertising content may be used for placement as commercials within a television show or as on-screen guide advertisements.

As defined herein, an asset refers to any type of media that may be played, accessed, recorded or viewed. Such media may include all the variants of television media, digital/analog radio media, music media, interactive games, and other audio and/or video media. Each asset may be associated with an identifier that identifies an aspect (e.g., name or title) of the asset. For example, the title of the movie "GoldenEye" may be associated with a video-on-demand asset or a recorded asset, and the title of the song "1979" by the Smashing Pumpkins may be associated with a music asset or game featuring the song's concept. Each asset includes asset characteristics that identify content present in the asset. Asset characteristics may include, for example, information conveying the amount of violence in the asset, amount of sexual content in the asset, genre type of the asset, parental control information pertaining to the asset, etc. Each asset may include a set of attributes which may include, for example, asset description, genre, subcategories (e.g., directors, actors, and/or filming location), service type (VOD, linear, pay-per-view, VOIP, DOCSIS, IPTV, SDV, etc.), scheduling (e.g., time of day, broadcast time, and/or number of broadcasts per day), rating, sub-rating, viewing status (e.g., viewed, unviewed, start/stop location of viewed portions, number of times asset has been viewed, number of times episodes from a series have been watched, etc.), feedback status (e.g., whether feedback has previously been provided or not for the asset), series membership, favorite assets membership, bookmark status, tagged status, channel association, website association, etc.

Media source 120 may store user preference profiles according to the invention which may be accessed by user equipment 110. For example, when a user sets up a user preference profile that contains preference characteristics relating to an asset, that user preference profile may be maintained at media source 120. Maintaining the user preference profile at media source 120 may be advantageous because media source 120 can dynamically adjust the contents or preferences of the user preference profile based on the user's local or remote viewing behavior. Maintaining the user preference profile at media source 120 may also be advantageous because it may be accessed by users and family members at a different user equipment 110. Alternatively, user preference profiles may be stored on user equipment 110.

User equipment 110 may include any equipment suitable for providing an interactive media experience. User equipment 110 may include television equipment such as a television, Tru2way™ television, set-top box, recording device (e.g., digital video recorder), video player, user input device (e.g., remote control, keyboard, mouse, touch pad, touch screen and voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV) and an optional Open Cable Unidirectional Receiver (OCUR) plug-in card or other security access card suitable for secure delivery of content. In some embodiments, user equipment 110 may include a gaming system, a portable electronic device, such as a portable DVD player, a portable gaming device, a cellular telephone, a personal digital assistant (PDA), a music player (e.g., MP3 player), or any other suitable portable or fixed device.

User equipment 110 may include a network interface (not shown) that interconnects various elements of user equipment 110 within, for example, a household. Such an arrangement may permit interconnection of multiple instances of user equipment 110 and/or use of a remotely located recording device (e.g., digital video recorder). The network interface may allow user equipment 110 to transmit and/or receive (over the internet or other communications path) electronic communications that allow feedback to be provided about an asset to/from a computer or website host.

In the example of FIG. 1, user equipment 110 includes at least control circuitry 118, display device 112, and user input device 114, which may be implemented as separate devices or as a single device. An interactive media guidance application, such as an interactive television program guide, may be implemented on user equipment 110 to control the display, on display device 112, of the media transmitted by media source 120 over path 122 and to provide interactive media guidance application features.

The media that may be played by user equipment 110 may vary widely. In fact, many different types of media may be played by user equipment 110. Many different types of media may be available because each media type may be unique in a technical sense (e.g., a particular technical implementation is required to play a particular type of media) or is considered unique in a definitional sense by way of service type (e.g., a video-on-demand program may be considered a different type of media than a broadcast program). The different types of media may be classified generally or to a desired degree of specificity. For example, media may be classified into various types, including television media, music media, and audio and/or video media. Within each general media type, more specific and different media types are available. Television media may include, for example, broadcast television programming, recorded television programming, video-on-demand (VOD) programming, near video-on-demand (NVOD) programming, pay-per-view programming, satellite television programming, and streaming video programming. Recorded television programming may be a recording of another type of television programming (e.g., linear programming). Recorded television programs or assets may be stored locally on user equipment 110 or remotely on networked user equipment (not shown). Recorded television programming or assets may also be stored on a remote network video recorder/server (such as media source 120 or similar remote server). Music media may include, for example, MP3 files, WAV files, MIDI files, AAC, Real media, Dolby Digital, or other suitable format with which music can be compressed, distributed and stored on user device 110.

Display device 112 may be any suitable device such as, for example, a television monitor, a computer monitor, or a display incorporated in user equipment 110 (e.g., a cellular telephone or music player display). Display device 112 may also be configured to provide for the output of audio. Display device 112 may be configured to present a display alerting a user about inconsistent actions performed relative to assets and provide asset listings of assets that have/have not been restricted (e.g., locked). Feedback options may be displayed on display device 112 allowing the user to provide information about any detected inconsistent actions.

Control circuitry 118 is adapted to receive user inputs from input device 114 and execute the instructions of the interactive media guidance application. Control circuitry 118 may include one or more tuners (e.g., analog or digital tuners), encoders and decoders, processors (e.g., Motorola 68000 family processors), memory (i.e., RAM and hard disks), communications circuitry (e.g., cable modem circuitry), input/output circuitry (e.g., graphics circuitry), connections to the various devices of user equipment 110, and any other suitable component for providing analog or digital media programming, program recording and playback, and interactive media guidance features. In some embodiments, control circuitry 118 may be included as part of one of the devices of user equipment 110 such as, for example, part of display 112 or any other device (e.g., a set-top box, television and video player).

Control circuitry 118 may receive actions performed relative to an asset (e.g., restricting access to a particular asset) from, for example, a user or an update. Control circuitry 118 may search for a second asset that has similar attributes as the asset for which the action was performed to determine if there exists an inconsistent action performed relative to the second asset (e.g., not restricting access to the second asset). Control circuitry 118 may determine that two or more assets have similar attributes by comparing attributes stored in asset data structures. Control circuitry 118 may display an alert when the second asset is found allowing the user to provide feedback about the inconsistency (or asset) or make the actions consistent by, for example, restricting access to the second asset.

For example, control circuitry 118 may receive a first action from a user to restrict access to (e.g., lock or block) all horror genre films. Control circuitry 118 may receive a second action that removes access restrictions from (e.g., unlocks or unblocks) a particular asset that is in the horror genre (e.g., Psycho). Control circuitry 118 may determine that Psycho has a similar attribute (e.g., shares the genre category) with at least one of the films for which the user restricted access. Control circuitry 118 may detect that the actions performed relative to the two assets (e.g., Psycho and another horror film) are inconsistent (e.g., the first action restricted access while the second action removed an access restriction). Control circuitry 118 may alert the user about the inconsistency by, for example, displaying on display device 112 a prompt stating, "You have unblocked Psycho but have blocked all other horror films, would you like to also unblock all horror films?" Control circuitry 118 may allow the user to remove the access restrictions from all horror films (e.g., in response to detecting that the user removed access restrictions to a particular horror film) or alternatively, allow the user to provide feedback about Psycho or another horror film that contains access restrictions. The feedback provided by the user may be transmitted to media source 120 or directly to advertising source 130 for reporting the user's approval or disapproval of the asset.

Control circuitry 118 may also automatically suggest a compromise position based on subcategories of assets which have similar attributes and for which inconsistent actions have been performed. For example, as exemplified above, the first action restricted access to all horror films and the second action removed access restrictions from a single member of that group (i.e., Psycho). Control circuitry 118 may prompt the user to, instead of removing access restrictions from all horror films (based on the inconsistent actions), remove access restrictions from all "Alfred Hitchcock" horror movies (i.e., a subcategory (a particular director) of the genre attribute).

Alternatively, control circuitry 118 may allow the user to remove access restrictions from all "Alfred Hitchcock" movies (i.e., a separate category related to a different attribute (director) than the attribute (genre) whose similarity between the two assets triggered the prompt). For example, the director "Alfred Hitchcock" may be a subcategory in the "horror" and "classic films" genres which both contain access restrictions. Accordingly, in response to receiving the action to remove restrictions from an asset in one restricted genre (i.e., the horror genre) having a particular director (or subcategory), control circuitry 118 may allow the user to manually (or automatically) remove access restrictions from assets in another restricted genre (i.e., the classic films genre) that have the same director.

Control circuitry 118 may transmit a communication to a computer (that hosts a website) when a user indicates the desire to provide feedback about a particular asset. The feedback may be stored in a queue and provided to the user when the user accesses the website from user equipment 110. User equipment 110 on which the user accesses the website to provide feedback may be the same or a different user equipment 110 that was used to perform the action relative to the asset (e.g., restricting access to the asset). The computer may transmit the user's feedback reporting the user's approval or disapproval of the asset to media source 120 or directly to advertising source 130.

User equipment 110 may include a storage device 116 such as, for example, memory or hard-drive (e.g., digital video recorder). Only one such storage device is shown to avoid overcrowding the figure, though it should be understood that additional storage devices may be used as desired. Storage device 116 may store data (e.g., playlists) and media (e.g., recorded assets). In another embodiment (not shown) user equipment 110 may be able to access a storage device located at a remote site and store data and/or media at that remote storage device. Such a remote storage device may be referred to herein as a networked storage device or a networked digital video recorder.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data source 124. But for clarity of illustration, the equipment of only a single user is shown. The equipment of the plurality of users may be connected to media source 120 and data source 124 using a cable television network, a local area network (LAN), a wireless network, or any other suitable means. In some embodiments, multiple instances of user equipment 110 may be connected or networked to each other using any suitable means (e.g., within a household using a LAN, potentially using the Multimedia Over Coax (MoCA) standard or between households using a WAN over DOCSIS network).

User equipment 110 may receive interactive media guidance application data from one or more data sources 124. Data sources 124 may provide data for a particular type of content or for a particular application. For example, one data source 124 may provide data for non-on-demand assets (e.g., non-pay and pay-per-view programs), and another may provide data for on-demand assets (e.g., VOD programs). Or, for example, a single data source may provide both of these types of data. For example, one data source 124 may provide data for an interactive television program guide. Another data source 124 may provide data for asset characteristics or attributes used in determining which assets have similar attributes to detect inconsistent actions. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

For the purpose of clarity, the following discussion may sometimes describe an embodiment in which the interactive media guidance application is an interactive program guide. It will be understood, however, that the following discussion and the features discussed may be applied to any interactive media guidance application including online or Internet based media guidance applications.

A member of a household watching a particular program may decide to restrict access to the program and other related programs because of undesirable or inappropriate content that is provided with the program. For example, a parent may decide to restrict access to adult programming because of the presence of children in the home. Accordingly, the parent may instruct the system to restrict access to all programming above a certain rating. Additionally, the user may restrict access to programs based on title or other attributes. The system may automatically or upon request by the user, search and find other programs that have similar attributes as the restricted program. The system may allow the user to restrict access to the other programs and/or provide feedback about the restricted program.

Figure 2:
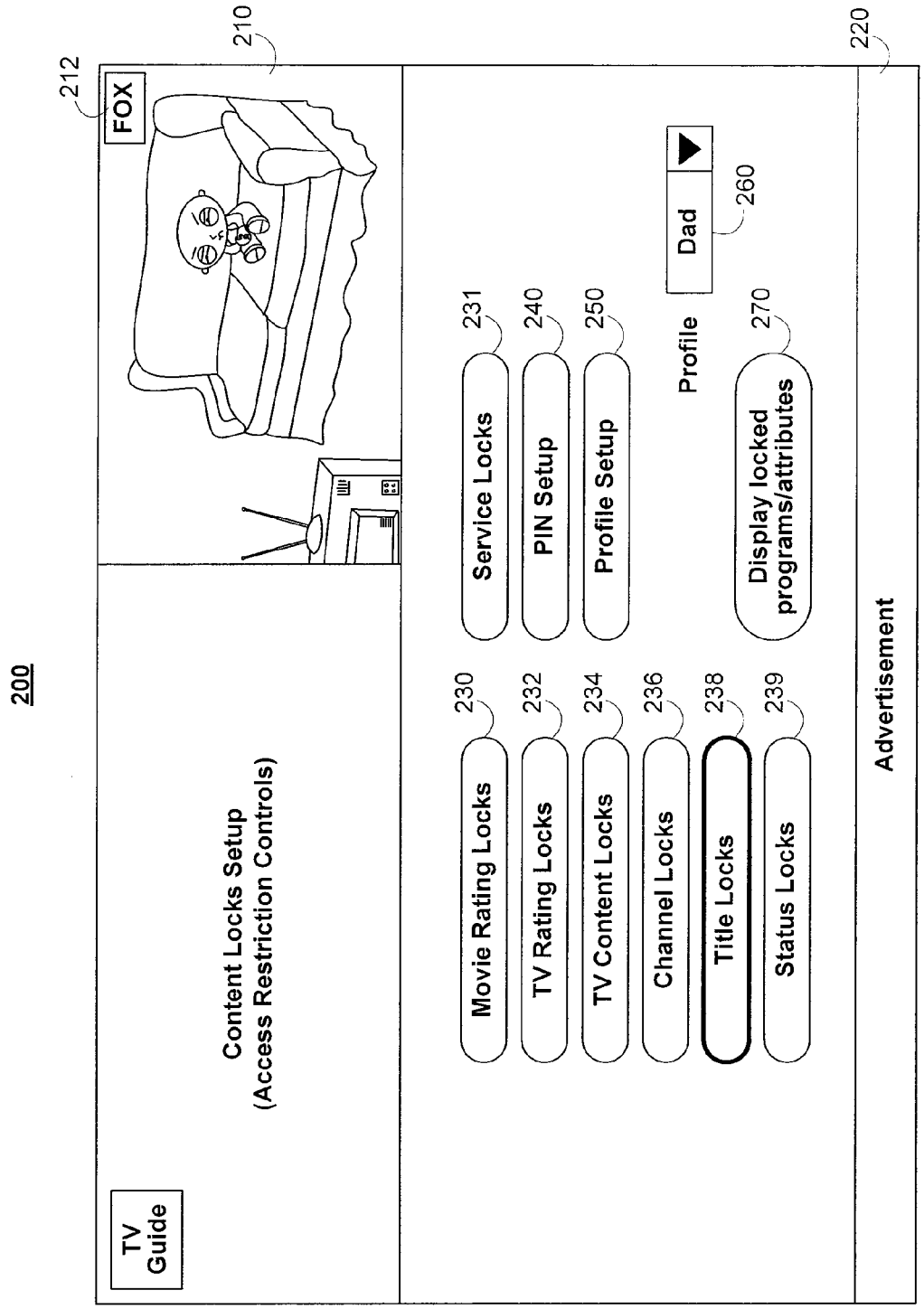
FIG. 2 shows an illustrative asset restriction setup screen in accordance with an embodiment of the present invention.

FIG. 2 shows an illustrative asset restriction setup screen 200 in accordance with an embodiment of the present invention. Screen 200 may include a video display portion 210, various asset restriction options that are based on asset attributes and an advertisement portion 220. Video display portion 210 may display the last channel tuned to by the user along with a channel identifier 212. The video displayed in video display portion 210 may be a live video stream, a short on-demand segment, an advertisement segment, a website, or any other type of video or still image.

Advertisement portion 220 may provide one or more advertisements that may be targeted based on a particular user profile or the video displayed in video display portion 210. The advertisement may include content provided by advertising source 130 (FIG. 1). The advertisement displayed in advertisement portion 220 may be a video or still image. Advertisement portion 220 may be interactive allowing the user to select the region to receive more information about the content being advertised or to place an order for the content being advertised.

The user may enter the asset restriction setup screen 200 in order to restrict access to one or more assets based on one or more attributes. For example, the user may be watching a particular program and during the program the user may decide to restrict access to the program. Accordingly, the user may select an option from a displayed menu that brings the user to screen 200. The program that was being viewed may simultaneously be viewed through video display portion 210.

As shown, the user may restrict access to assets based upon any of several types of attributes. For example, the user may restrict access to movies rated above, for example, PG-13 by selecting movie rating locks option 230. The user may restrict access to television programs rated above, for example, TV-PG by selecting television rating locks option 232. Additionally, the user may restrict access to assets based on their descriptions (e.g., based on certain words that appear in the description) or their general content (e.g., adult programming or educational programming) by selecting television content locks option 234. The user may restrict access to various channels by selecting channel locks option 236. Other types of attributes that may be used as a basis for restricting access include asset viewing status which may be restricted by selecting status locks option 239 and type of service of the asset which may be restricted by selecting service locks option 231. As shown, a highlight indicates selection of title locks option 238 which selection may allow the user to navigate to title lock screen 300, discussed below in connection with FIG. 3.

For purposes of brevity and clarity, and not by way of limitation, not every attribute is shown or described in the context of this invention. It should be understood that other attributes may also be used as a basis for restricting access to assets. Additionally, by way of example and not limitation, this invention is described in the context of a title restriction of an asset but should be understood to be applicable to any type of restriction based on an attribute.

A display locked programs/attributes option 270 may also be provided. Selecting display locked programs/attributes option 270 may cause the system to display a list of all assets and/or attributes that are restricted (which may be based on a particular user profile). For example, when assets Pokemon and Family Guy are restricted and the user selects display locked programs/attributes option 270, the system may retrieve the two assets and display their titles and, for example, another attribute such as the next time of broadcast. The user may remove access restrictions to any one of the assets from the displayed list of restricted assets. Additionally, if certain attributes (e.g., channels or ratings) have been restricted, the system may display the restricted attributes. The user may modify or remove the access restrictions to the restricted attributes from a displayed list of restricted attributes.

The user may select a user profile using drop-down menu 260 to load settings unique to a particular user. After a user profile is selected, the system may request a pin associated with the selected user profile to be provided in order to verify the user's identity. For example, a user "dad" may select the corresponding "dad" profile from menu 260. After the user enters the verification information, the system may change the asset restrictions to match the user's settings. In particular, while one user may be allowed to watch certain programs, another may not. Accordingly, selecting the particular user profile may instruct the system to restrict/grant access to particular assets based on the attributes of the assets. Additionally, the system may store various viewing behaviors in a one or more user profiles that are selected.

The user profiles stored in the system may also be linked or grouped with each other in order to maintain consistency between asset restrictions. User profiles may be linked by selecting profile setup option 250. The relationship between user profiles (e.g., father/mother or brother/sister) may also be configured by selecting user profile setup option 250. For example, two parent profiles may be linked to each other such that when one parent (e.g., the mother) using a particular user profile removes access restrictions to/from a particular asset based on one attribute (e.g., director or actors in an asset), the system may check for a linked user profile (e.g., the father's profile) to ensure that the other attributes (e.g., an asset title) restricted by the father are consistent with the mother's action. In particular, two users may be part of a parent group and may perform inconsistent actions as parents. For example, one parent (who belongs to the parent group profile) may restrict access to an episode of the program "Sponge Bob" and another parent (who belongs to the same parent group profile) may enable access to a movie (i.e., a different asset) featuring characters from the restricted program "Sponge Bob." These actions may be considered to be inconsistent and the system may detect such an inconsistency and alert the user. In some embodiments, conflicting actions with respect to the same asset from parents or generally from members of the same supervisory group may be flagged by the system. If one parent or member of the group had restricted access to the program "Sponge Bob" and another parent or member of the group attempted to remove the restriction, the parent or member of the group that attempted to restrict access may be informed of the discrepancy.

To setup the pin for a particular user profile(s) the pin setup option 240 may be selected. Pin setup option 240 may bring up a prompt requesting a pin or unique identifier for a particular user profile to be entered if one has not previously been provided. Alternatively, if a pin has already been set for a particular profile, pin setup option 240 may allow the user to change the pin or unique identifier associated with the profile.

After selecting one of the attributes to use as a basis for restricting access to an asset, the user may be provided with a display that allows the user to specify the restriction and search for assets with similar attributes.

Figure 3:
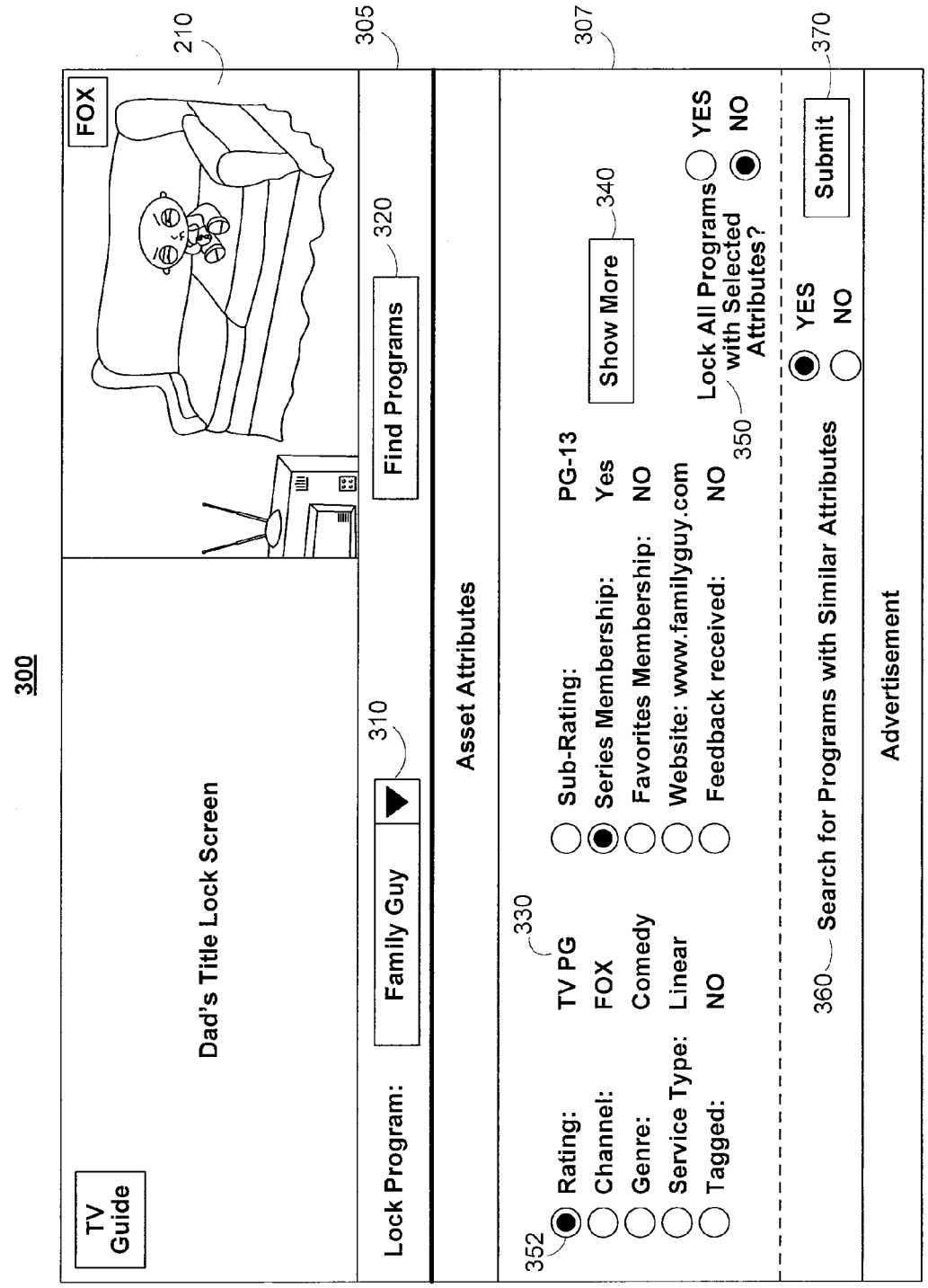
FIG. 3 shows an illustrative asset attribute restriction screen in accordance with an embodiment of the present invention.

FIG. 3 shows an illustrative asset attribute restriction screen 300 in accordance with an embodiment of the present invention. The attribute selected by the user by which to restrict access is an asset title (by selecting asset title locks option 238). Screen 300 may include a title selection portion 305 and a selected asset attributes portion 307.

Title selection portion 305 may include a title menu 310 and a find similar assets option 320. The user can select the drop-down menu 310 to identify a particular title of an asset for which to restrict access. For example, as shown, the user has identified the title "Family Guy" as a title of an asset for which to restrict access. Initially, the titles available for selection through menu 310 may be a predefined set or all available titles on a particular channel. For example, the user may specify a channel using a channel option (not shown) and the system may allow selection of a particular title provided on the selected channel from menu 310. Additionally, menu 310 may include titles of assets for which access restrictions are in place. Assets in menu 310 which have asset restrictions may be distinguished from assets in menu 310 which are not restricted by displaying the restricted assets in a different color or other suitable way. The user may either unlock the restricted asset or change preferences of the access restriction.

The user may also select find assets option 320 to search for an asset if, for example, the asset title is not found in menu 310. For example, selecting find assets option 320 may provide a search screen in which the user may provide various criteria that identifies a program. In particular, the user may search for an asset using search terms, such as, a word that appears in the title, a channel, a word that appears in the description of the program, a genre of the program, or any of the asset attributes discussed above and below. The system may perform a search locally or remotely on the Internet using any suitable search engine (e.g., GOGGLE), to locate programs or assets that match the search terms. The system may then display a list of all matching titles resulting from the search. The user may restrict access to any one of the titles in the list.

It should be understood, that when the user is restricting access to a particular asset based on an attribute (e.g., genre), the user may find other assets having the same particular genre using a similar option as find assets option 320. The list of assets resulting from the search may be all the assets that belong to the selected genre and that match any other search term (e.g., have a particular word(s) in their description).

After a particular asset title is selected or found it may be displayed in menu 310 and one or more of the attributes from the asset data structure associated with the selected title may be retrieved from storage device 116 (FIG. 1). An exemplary asset data structure 900 is shown and described below in connection with FIG. 9. The retrieved attributes may be displayed in asset attributes portion 307. For example, the rating (e.g., TV-PG) of the selected asset (e.g., Family Guy) may be displayed next to a rating attribute 330. The size of the display may limit the number of attributes 330 that can be displayed. Accordingly, selection of a show more option 340 may supplement, change or bring into view a new display with additional attributes that are associated with the selected title.

Each attribute 330 may be displayed with a corresponding radio button 332. The user may identify a particular attribute of interest by selecting the corresponding radio button 332 of the attribute. Selecting attributes allows the user to identify other assets for which it would be desirable to restrict access. For example, the user may determine that the selected title is offensive or inappropriate due to a particular attribute (e.g., rating) and wish to restrict access to other assets that have a similar attribute.

After the user selects the one or more offensive attributes, the user may select submit option 370 to search for other assets that share the selected attributes. For example, control circuitry 118 may retrieve the values of the selected attributes from the asset data structure associated with the selected title and compare each of the values in the fields of the asset data structure to corresponding values stored in storage device 116 of other assets. When a match is found, control circuitry 118 may mark or tag the matching asset and subsequently display the matching assets in a conflict alert screen. The user may later decide to also restrict access to the other assets that have similar values for the selected attributes or ignore them.

The user may also instruct the system to lock all assets that have values matching the selected attributes automatically by selecting lock all matches option 350. Selection of submit option 370 instructs the system to lock the title that appears in menu 310 in addition to the search for assets that have similar selected attributes. The user may control whether other assets are searched for that have similar attributes in response to selection of the submit option 370 by toggling search for other assets option 360. For example, when search for other assets option 360 is set to YES, the system may provide a list of assets that have similar attributes as the selected attributes of the particular title of the asset that appears in menu 310. Alternatively, when search for other assets option 360 is set to NO, the system may lock the asset with the title that appears in menu 310 and return the user to the previously watched program that may appear in video display portion 210.

In some embodiments, asset attributes portion 307 may be omitted from the display. After the user selects a title from menu 310 and executes the selection by selecting submit option 370, the system may automatically perform a search for assets that have at least one similar attribute as the asset corresponding to the selected title. The results from the automatic search may then be provided as discussed above and below allowing the user to lock or ignore the assets which have a similar attribute as the asset corresponding to the selected title. In some implementations, some attributes of an asset may be marked as being of high importance (e.g., rating may be marked as important while service type may not) and the system may only search for assets that have a similar attribute as the marked high importance attribute of the asset corresponding to the selected title. This may make the search for other assets more efficient and provide results quicker. If asset attributes portion 307 is provided, the default may be to have the radio buttons 332 of all the attributes that are marked as high importance pre-selected. A clear or toggle option (not shown) may be provided to undo selection of radio buttons 332.

In some embodiments, an on-screen menu 520 (FIG. 5) may be displayed with a particular program. On-screen menu 520 may include a lock title option 540, a lock channel option 550, a lock time option 560 or any other lock option for an attribute of a particular asset. Selection of any of the lock options from the on-screen menu 520 may navigate the user to screen 300 to allow the user to lock the title, channel, or time of the displayed program. For example, when the user selects lock title option 560 and the program being watch is "Family Guy," the system may display screen 300 and the title (e.g., Family Guy) of the program that is being watched may be displayed in menu 310. The system may also optionally display the attributes associated with the asset corresponding to the selected title in potion 307 as discussed above.

The results from the search for assets that have at least one similar attribute as the locked asset and for which an inconsistent action has been performed (e.g., an inaction such as not locking the assets) may appear in a list in a conflict alert screen. The user may select between the assets in the list to lock any one or all of the assets.

Figure 4:
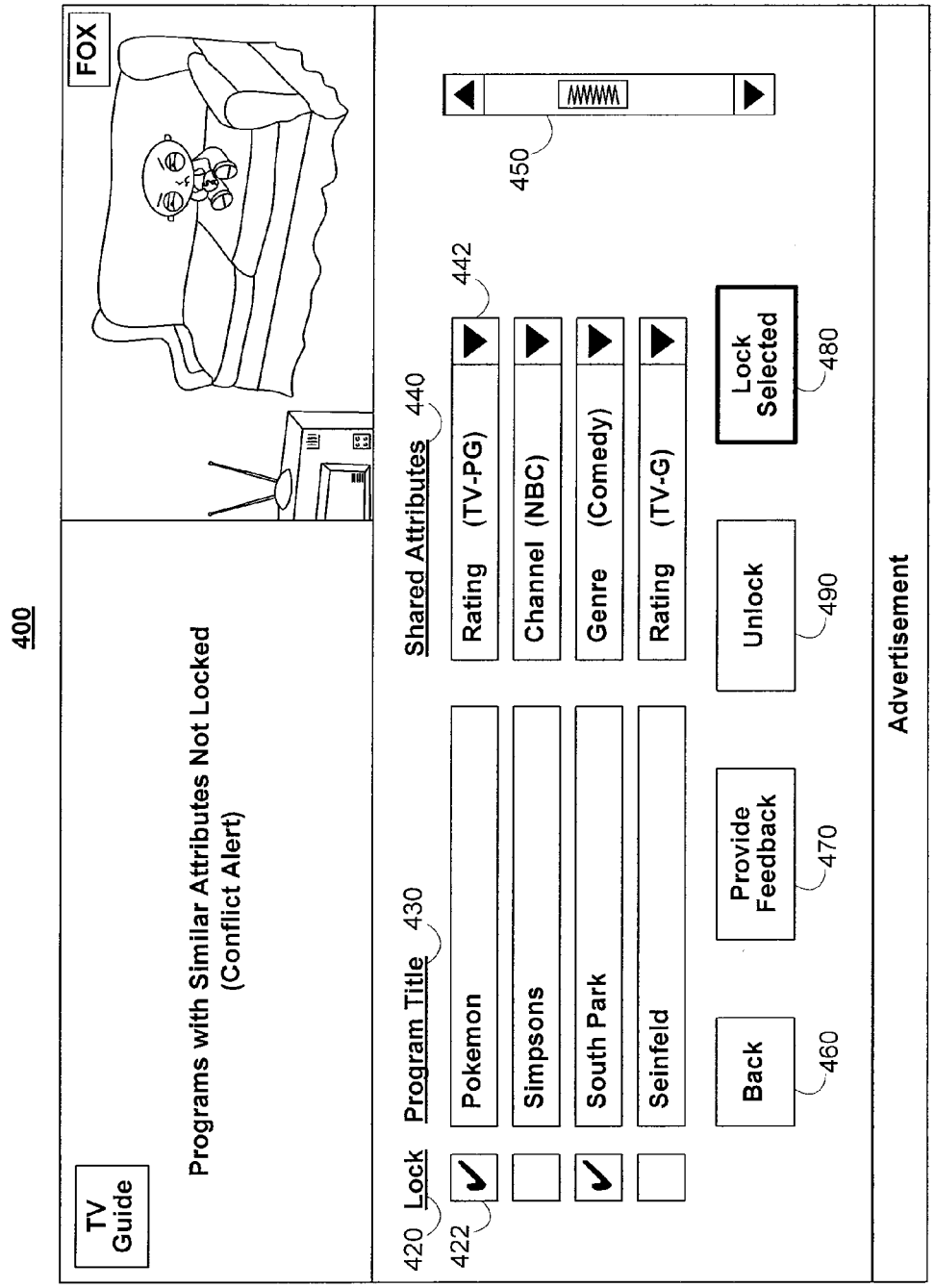
FIGS. 4, 6 and 7 show illustrative conflict alert screens in accordance with an embodiment of the present invention.

FIG. 4 shows an illustrative conflict alert screen 400 in accordance with an embodiment of the present invention. Conflict alert screen 400 provides a list of assets which have at least one similar attribute as the asset which the user selected to lock (i.e., because of the asset's title, genre, rating, etc.).

Screen 400 includes a list of assets by title 430, list of shared attributes 440 and lock options 420 for each asset in the list of assets by title 430.

The user may view the titles of assets that have a similar attribute as the locked asset and which, for example, have not been locked in list of titles 430. For example, the user may have selected to lock the title "Family Guy" associated with a particular asset and the system may determine that the asset with the title "Pokemon" shares an attribute with "Family Guy" but has not been locked. Accordingly, the "Pokemon" asset title may be displayed in list 430. The system may also provide the attribute which the asset shares (i.e., the similar attributes) with the locked asset in shared attributes list 440. For example, a drop-down menu 442 may be selected to view all of the attributes (if more than one exists) that are similar between the locked and unlocked assets. In particular, the system may determine that the asset "Pokemon" which is not locked shares rating attribute (e.g., TV-PG) with the locked asset "Family Guy" and accordingly "rating" may be displayed in drop-down menu 442 next to the title of the asset "Pokemon".

Any assets not displayed in the list due to the limited amount of space may be brought into view by scrolling the list of titles 430 up/down using scroll bar 450. For example, there may be one additional asset which shares attributes with the locked asset but is not shown in screen 400 because the screen is limited to displaying a certain number of asset titles.

Accordingly, scrolling down using bar 450 may remove some of the asset titles from the top of title asset list 430 and display other asset titles at the bottom of the list.

The user may decide to lock any one of the assets displayed in list of titles 430 by selecting the checkbox 422 next to the particular asset. For example, the user may desire to lock the assets entitled "Pokemon" and "South Park" but to leave the other assets unlocked. Accordingly, checkboxes 422 next to each of the assets which the user would like to lock may be enabled. The user may subsequently select the lock selected option 480 to lock the assets identified by checkbox 422 and the system may then exit the menu and return the user to the previously watched program or another channel.

Back option 460 may be provided in screen 400. The user may select back option 460 to return to screen 300 to modify selection of a locked asset or attributes to consider in the search for assets that share similar attributes with the locked asset. An unlock option 490 may also be provided. Selection of unlock option 490 may undo the action performed on the asset selected in screen 300 (FIG. 3). For example, when the user selects a title to lock in screen 300 and subsequently performs a search for assets with similar attributes, selection of unlock option 490 may remove the lock from the title selected to be locked in screen 300.

A provide feedback option 470 may also be provided in screen 400. Selection of provide feedback option 470 may allow the user to specify reasons for selecting the attribute to lock or for which to restrict access or specify reasons for locking or not locking assets that have similar attributes as the locked asset. For example, the user may select to lock the title "Family Guy" in screen 300 and may select provide feedback option 470 to specify why the particular title was locked. In particular, although other assets may share attributes with the locked title, the user may not wish to lock the other assets and accordingly provide reasons for the inconsistency. The way in which the user may provide the feedback is discussed below in more detail in connection with FIGS. 8 and 11-13.

For example, unlocked asset "Seinfeld" may share a rating attribute with the locked asset "Family Guy" but the user may not select to lock "Seinfeld" which may be an inconsistent action with the desire to lock a similarly rated asset. It may be beneficial to provide reasons for the inconsistency (i.e., why the user chose to lock Family Guy but not Seinfeld) to cause a change in content or sponsorship of Family Guy. In particular, if a sponsor of Family Guy receives feedback from enough users about the inappropriateness of the content, the sponsor may choose to advertise or provide funds to a different channel or asset. By providing feedback the user may also suggest a different, perhaps more suitable, rating for the asset. Other examples of where a user may want to provide feedback for programs include (a) reporting on the accuracy of news programs or history programs, (b) commenting on missed opportunities for education in children's programming, (c) commenting on the advertising appropriateness to content, (d) commenting on product placement within content, and (e) making suggestions for improvements in programming or plotlines or ideas for plot twists in new series episodes.

Figure 5:
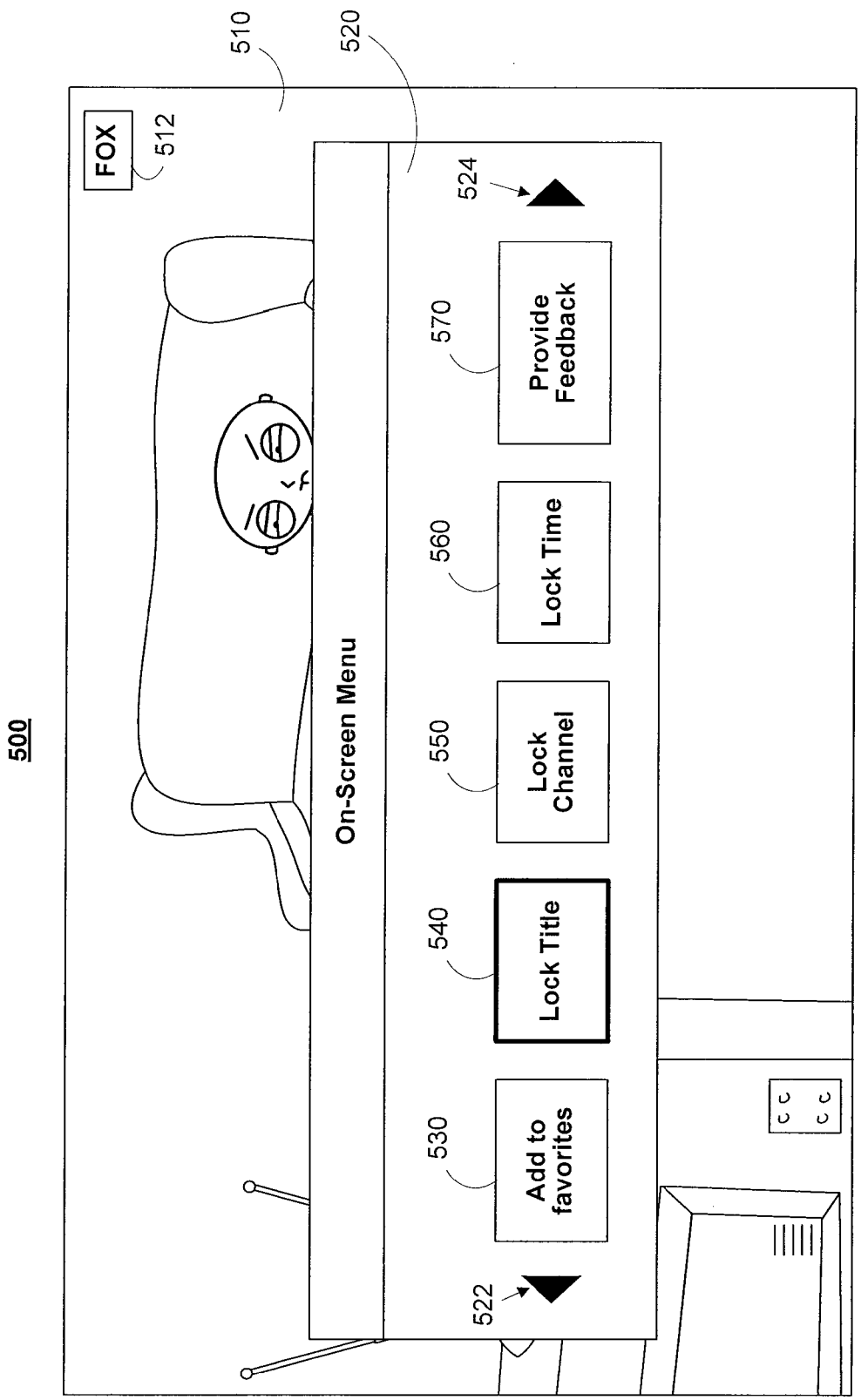
FIG. 5 shows an illustrative on-screen menu selection screen in accordance with an embodiment of the present invention.

FIG. 5 shows an illustrative on-screen menu selection screen 500 in accordance with an embodiment of the present invention. Screen 500 includes a program being watched 510 and a channel identifier 512 on which the program is broadcast. An on-screen menu 520 may be displayed with program 510 as a transparent overlay (allowing the overlaid portions of program 510 to be viewed through the overlay), a translucent overlay, or any other suitable overlay. As the user is accessing the asset (e.g., program 510), the user may perform an action on the asset. The options displayed in on-screen menu 520 allow the user to perform an action relative to the asset.

For example, the user may lock the asset being viewed by title by selecting lock title option 540 (which may bring up screen 300 (FIG. 3)). Other options which are not shown corresponding to different attributes of the asset may be provided through which the user may act upon to lock an attribute of program 510. For example, selecting the right arrow 524 or left arrow 522 may display other locking options in on-screen menu 520 that the user may select to act upon the asset being viewed.

The user may also select a provide feedback option 570 to provide reasons of like/dislike for the asset being viewed. For example, selection of provide feedback option 570 may display a provide feedback screen 800 (FIG. 8) through which the user may provide the positive/negative reasons about the like/dislike of the asset. In one embodiment, an option is provided that allows users to be educated on the movie and/or television rating system. In such embodiments, exemplary content with specific ratings may be accessed and explanatory text providing guidelines that are used by content providers in rating content may be provided. An example of such a system is provided in U.S. patent application Ser. No. 12/006,103, filed Dec. 28, 2007, which is hereby incorporated by references herein in its entirety. In some embodiments, access to feedback provided by other users may be provided a particular user regarding assets in question, including full textual feedback that was entered by the other users using, for example, a web interface.

In some embodiments, the system may automatically search for assets that have similar attributes as a locked asset to determine whether there is an inconsistency between actions performed relative to the assets. For example, the user may perform a first action by locking the asset "Family Guy" which has a rating attribute of TV-PG. The system may in response determine whether other assets that have a similar attribute (e.g., assets rated TV-PG) have had the first action performed relative to them (i.e., been locked). The system may determine that the actions with respect to the assets are inconsistent (e.g., because one action locked the asset and the other action did not (i.e., the other action is an inaction relative to the other assets)) and alert the user about the conflict.

Figure 6:
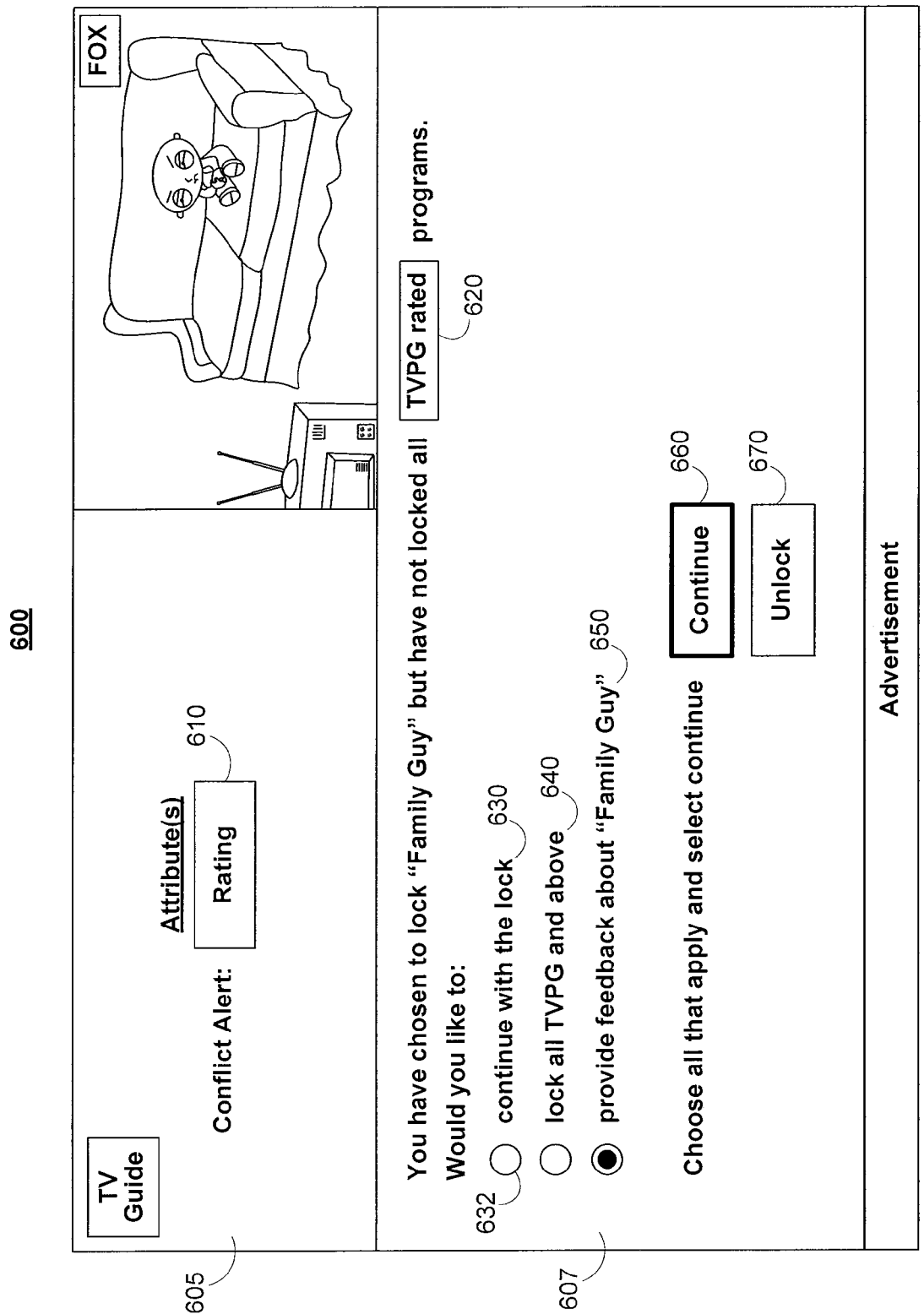

FIG. 6 shows an illustrative conflict alert screen 600 in accordance with an embodiment of the present invention. Screen 600 includes a conflict alert portion 605 and a conflict resolutions section 607.

Conflict alert portion 605 may identify the similar attribute 610 among the assets which inconsistent actions are performed. For example, when the user locks an asset having a particular rating attribute but does not lock another asset having the same or higher rating attribute, the system may alert the user to the conflict (or inconsistency) by indicating the two assets are similar in rating attribute 610 and indicate inconsistent actions have been made relative to the assets. The system may display more than one attribute 610 if the assets have multiple similar attributes.

Conflict resolutions section 607 allows the user to specify how the inconsistent actions are to be resolved. For example, conflict resolutions section 607 may include a message specifying the value 620 (e.g., rating attribute with value TV-PG) of the similar attribute and provide the user with different selectable options to resolve the conflict. In particular, the system may display a message indicating that the user has locked asset "Family Guy" which has a rating attribute with value TV-PG but has not locked all assets with that value or higher for the rating attribute.

The user may select a continue with the lock option 630 by selecting radio button 632. Selection of continue with lock option 630 allows the user to ignore the alert or conflict and only lock the specified asset (e.g., "Family Guy") and not any of the other assets that have a similar attribute. Additionally, the user may select a lock all assets with the similar attribute option 640. Selection of lock all assets with the similar attribute option 640 may cause all the assets that share or have the similar particular attribute 610 as the locked asset to also be locked at the same time. For example, asset "Family Guy" may have a rating of TV-PG and the system may allow the user to select option 640 to lock all other assets having that particular rating (e.g., TV-PG). It may be desirable to, in addition to locking all assets having the similar attribute (e.g., TV-PG), lock all other assets that are rated higher than TV-PG (e.g., TV-MA) since their content may exceed a viewing threshold of the user.

A provide feedback option 650 may also be selected. Provide feedback option 650 may have similar functionality as provide feedback option 470 (FIG. 4) and provide feedback option 570 (FIG. 5). In particular, the user may select provide feedback option 650 to provide reasons for the inconsistency or conflict between the actions performed relative to a first asset and the assets that have similar attributes as the first asset. For example, the user may provide reasons for locking asset "Family Guy" but not locking all other assets that have a similar rating attribute of TV-PG. Selection of provide feedback option 650 may present the user with screen 800 (FIG. 8) discussed in more detail below.

After the user selects all of the desired conflict resolutions by way of selecting radio buttons 632, the user may select continue option 660 to execute the user's selections. For example, when lock all assets with the similar attribute option 640 and provide feedback option 650 are selected, the user may select continue option 660 to execute locking all of the similarly rated assets and display screen 800 to allow the user to provide feedback. The user may also select unlock option 670 to undo the locking operation of the selected asset (e.g., "Family Guy") and navigate back to screen 300 to select a different asset to lock, select different attributes to search for similar assets based on, or cancel all operations and return to the previously viewed program.

Figure 7:
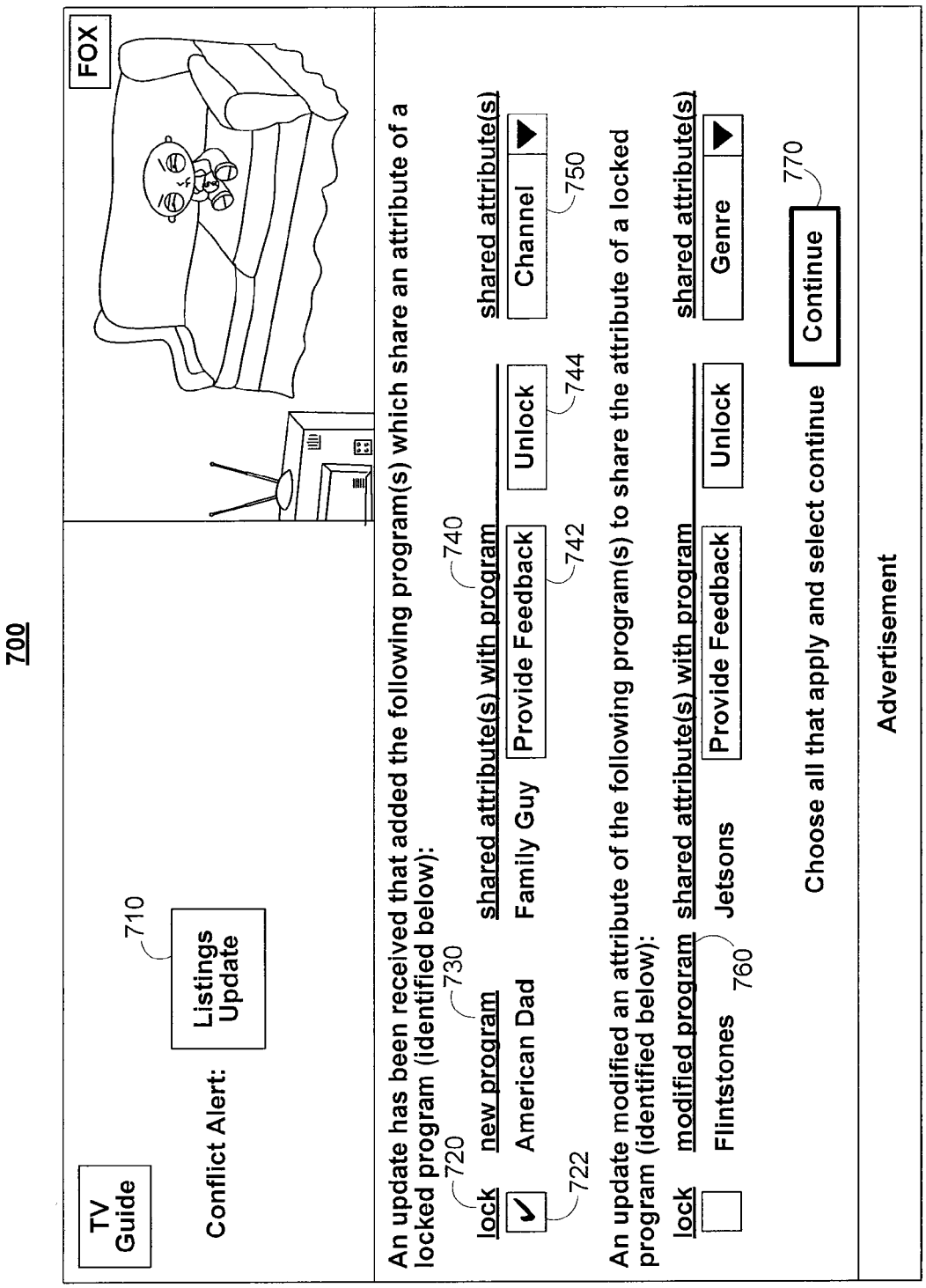

In some embodiments, the system may detect an inconsistency between actions performed relative to assets in response to an update to the program guide. FIG. 7 shows an illustrative conflict alert screen in accordance with an embodiment of the present invention.

In particular, the user may initially perform a first action (e.g., lock) relative to a particular asset (e.g., "Family Guy"). When an update to the program guide listings is received, the system may search the updated program listings for assets that have similar attributes as the locked asset to determine whether inconsistent actions have been performed. If the system detects inconsistency between actions performed relative to the particular asset and the updated assets, the system may indicate a listings update conflict alert 710.

The system may list assets which have not been locked that have been updated and that have a similar attribute as the locked asset (e.g., list of programs added to the program listings 730 or list of programs having a changed attribute 760). In particular, the update to the listings may have changed an attribute of a particular asset to be similar as the locked asset. Such an asset may be identified in the list of program that have changed attributes 760.

The user may lock any one of the assets displayed in lists 730 and 760 by selecting the checkbox 722 corresponding to the particular asset. The system may lock all the selected assets after the user selects continue option 770. Alternatively, the user may cause any of the assets in lists 730 or 760 to automatically be locked by positioning a cursor over the displayed title of the asset and selecting the asset. A confirmation prompt (not shown) may optionally be displayed to confirm the user's desire to lock a particular asset or cancel the selection.

The system may display a list 740 that indicates which locked asset shares an attribute with the newly added asset. For example, asset "Family Guy" may be locked and asset "American Dad" may be added to the program guide listings in response to an update. The system may determine that the two assets have similar attributes (e.g., channel or rating). Accordingly, the system may display newly added asset "American Dad" in list 730 and the locked asset "Family Guy" with which the added asset shares an attribute in list 740. This may be helpful when the user has locked multiple assets and would like to know which of the multiple assets caused the conflict with the newly added asset or asset with the changed attributes.

A drop-down menu 750 may indicate what the shared attributes between the two assets are when there are multiple shared attributes. Additionally, as discussed above, the user may select unlock option 744 to unlock the originally-locked asset (e.g., "Family Guy") or feedback option 742 to provide reasons for the inconsistency between the actions. For example, if the user chooses to not lock the newly added asset, the user may provide reasons for the inconsistent actions (i.e., why the user chose to lock one asset and not the other even though they share an attribute) by selecting feedback option 742. Similar options and lists are provided for conflicts resulting from changed attributes of programs.

In some embodiments, the user may provide feedback about an asset. The feedback may be positive when the user likes something about an asset or negative when the user dislikes something about an asset or inconsistency. The feedback may be provided in response to performing an action (e.g., locking) relative to a particular asset.

Figure 8:
FIG. 8 shows an illustrative asset feedback screen in accordance with an embodiment of the present invention.

FIG. 8 shows an illustrative asset feedback screen 800 in accordance with an embodiment of the present invention. Screen 800 allows the user to provide positive/negative reasons about an asset. For example, when the user locks a particular asset but does not lock an asset that has a similar attribute as the locked asset, the user may specify reasons for the inconsistency. In particular, the user may specify reasons for locking a particular asset by selecting various options in a limited interactivity television program guide interface.

The system may display the asset title 810 for which feedback is being provided. Various feedback options/reasons 820 are provided with radio buttons 822. The user may enable each radio button 822 based on the feedback the user wants to provide. In particular, the user may enable radio button 822 to provide feedback indicating the asset exceeds the given rating attribute (e.g., the rating is inappropriate for the asset). The user may also select different radio buttons to give reasons why the asset exceeds the rating attribute (e.g., because of sex, violence, or language). The user may also suggest a rating by selecting a rating from drop-down menu 830 that the user believes is more suitable for the particular asset.

Options indicating that the asset is offensive in one or more areas may also be selected. In particular, among other options, the user may specify that the asset is offensive to minorities or women, is religion intolerant, contains content that is politically incorrect, contains content relating to animal cruelty, or contains immoral content. The user may select submit option 850 after selecting the desired feedback options to send the feedback to the media provider or sponsors of the asset.

Additionally, selection of back button 840 may return the user to the previous screen and selection of unlock option 870 may cancel the feedback submission and unlock the asset with title 810 (e.g., Family Guy).

In some embodiments (e.g., those using a set-top box with remote control and no keyboard) the user may be limited in amount of feedback he/she can efficiently provide. For example, it may be difficult for the user to provide textual input about an asset through the television system. Accordingly, the user may select more feedback option 860 in order to be given the opportunity to provide feedback based on options that are not available on screen 800 (e.g., using a keyboard and an on-screen a text box) via a website.

Selection of more feedback option 860 may transmit a communication to a remote computer (e.g., a web server) that includes an identification of the user and the asset for which the user would like to provide more feedback. As discussed in more detail below in connection with FIGS. 10-13, the user may subsequently access the webpage from the web server or remote computer using another device (e.g., a computer). The user may be able to more easily provide feedback about the particular asset in the webpage by, for example, in addition to selecting radio buttons or check boxes, inserting text into a text box using a keyboard and mouse (as opposed to or in addition to a remote control).

As discussed above, each asset may have a corresponding data structure stored in storage device 116 (FIG. 1). FIG. 9 shows an illustrative asset data structure 900 in accordance with an embodiment of the present invention. Data structure 900 may include various fields that specify the attributes of the asset. For example, title field 910 may specify the title of the asset, on-demand field 920 may indicate whether the asset is available on demand and shared attributes field 930 may include pointers to other assets that are known to share attributes with the asset corresponding to the particular asset data structure.

When searching for assets that have similar attributes as a locked asset, control circuitry 118 may compare each field (or a subset of the fields) of the locked asset's data structure 900 with other stored asset data structures 900 (FIG. 9). If the value(s) of particular fields in the locked asset's data structure match another asset's data structure fields, control circuitry 118 may determine that the two assets have similar attributes and detect whether inconsistent actions have been performed relative to the assets. For example, a first asset's data structure may have a field that specifies that the first asset has been locked and a second asset's data structure may have the same field indicating the second asset is not locked. This may indicate inconsistent actions have been performed relative to the first and second assets and accordingly control circuitry 118 may alert the user about the inconsistency.

Shared attributes field 930 may be provided in asset data structure 900 to make the search for assets with similar attributes more efficient. In particular, the locked asset's data structure 900 may include a number of shared attributes fields 930 that each link the asset to another asset. For example, the values in shared attribute fields may include a title 932 of a second asset which has similar attributes as the locked asset associated with asset data structure 900 and a pointer to an address location 934 where the second asset's data structure is stored. Accordingly, instead of comparing every field of every asset data structure to find similar assets, control circuitry 118 may simply retrieve the asset data structure associated with a locked asset and find the locations of all the data structures of assets which have similar attributes as the locked asset based on the values of shared attributes field 930.

In some embodiments, the user may provide more detailed feedback information through a website interface. An electronic communication may be transmitted including a user and asset identifiers to a computer which may host a website. The user may access the website and provide more detailed feedback about the asset to the media provider.

Figure 10:
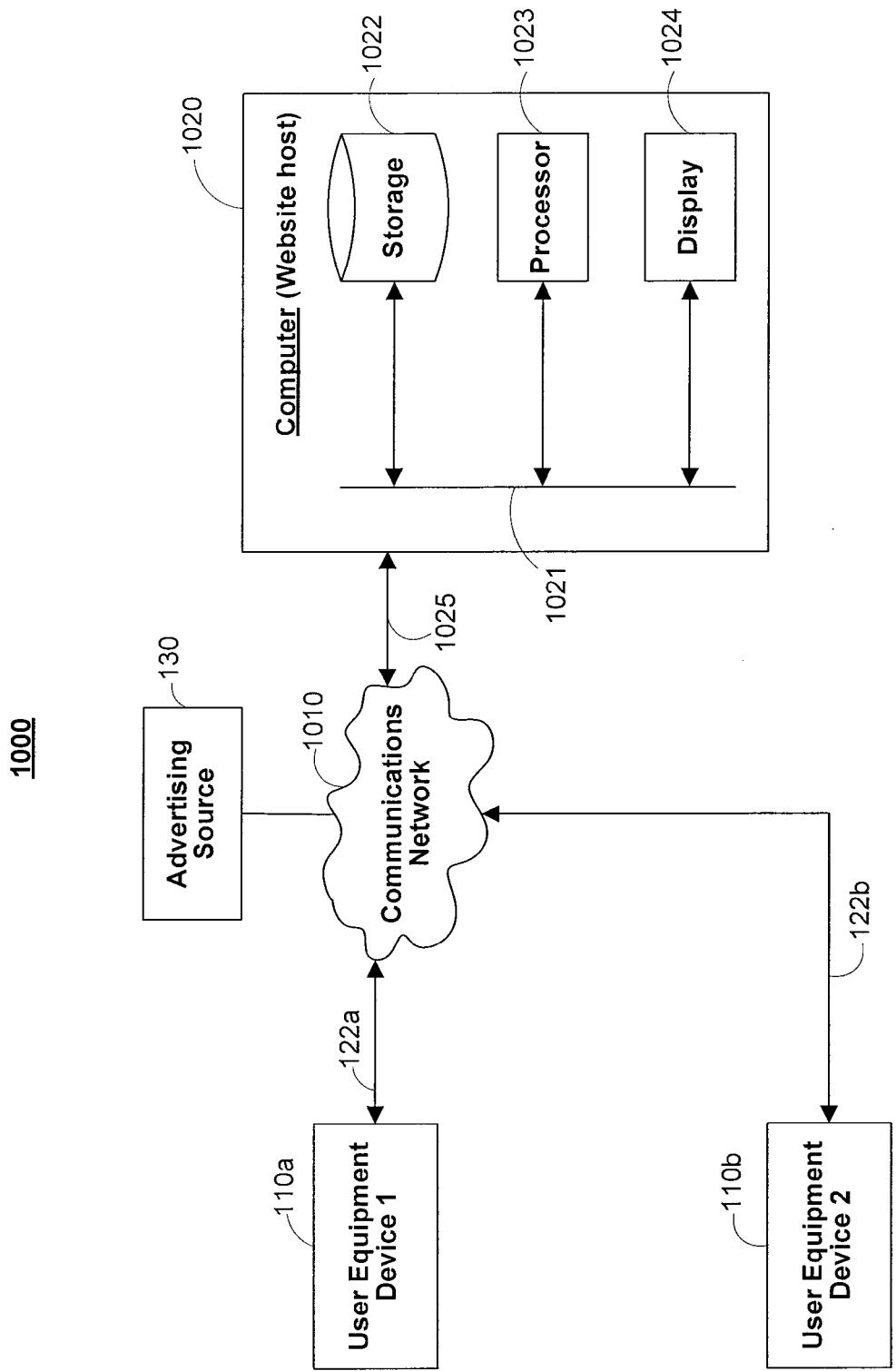
FIG. 10 is a diagram of an illustrative online asset feedback system in accordance with an embodiment of the present invention.

FIG. 10 is a diagram of an illustrative online asset feedback system 1000 in accordance with an embodiment of the present invention. System 1000 includes first and second user equipment devices 110*a-b*, a communications network 1010 and a computer 1020.

The user may lock a particular asset using a television equipment device such as device 110*a*. In response to locking the asset, the system may allow the user to provide feedback. The user may desire to provide more detailed feedback (e.g., through a text interface) than the feedback options available on device 110*a*. Accordingly, the user may select a more feedback option 860 (FIG. 8).

In response to the user request to provide more feedback, user equipment device 110*a* may retrieve a user identifier (e.g., a user profile, account number, or any other unique identifier associated with the user) along with a unique identifier of the asset for which the user desires to provide detailed feedback. The unique identifier of the asset may be stored in an asset data structure and may be the title of the asset, episode number, character code, or any other suitable identifier that identifies the particular asset. User equipment device 110*a* may transmit the user identifier and asset identifier through communications path 122*a* to communications network 1010. Communications network 1010 may be any suitable communications network including, for example, a satellite network, a fiber-optic network, a cable network, an Internet network, or any other suitable wired or wireless network.

Computer 1020 may be coupled to receive the user and asset identifiers (i.e., the detailed asset feedback request) from network 1010 through path 1025. Computer 1020 may be a website host that includes a storage 1022, processor 1023, a display 1024 and a local bus 1021. Computer 1020 may store the detailed asset feedback request as an entry in a feedback queue in storage 1022. As each detailed asset feedback request is received the request may be appended to the end of the queue. Although the invention is described in the context of a queue, it should be understood that a stack, linked list, time stamps, database or any other type of organizational data structure may be used instead. In some implementations, the feedback queue may be partially stored in storage 1022 in computer 1020 and on another device such as user device 110*b*. Alternatively, the feedback queue may be transferred completely or generated on user device 110*b* which may avoid having to transmit information over communications network 1010.

The user may access the webpage hosted by computer 1020 through user equipment device 110*b*. User equipment device 110*b* may be implemented on a different computer or on the same computer as computer 1020. When the user loads the webpage and signs in, computer 1020 may determine whether the user is associated with any feedback requests stored in storage 1022. Computer 1020 may retrieve a feedback request entry associated with the user from the queue in storage 1022 and provide an electronic communication through communications network 1010 to user equipment device 110*b*. In some implementations, when user equipment device 110*b* is implemented on computer 1020, this step may be unnecessary. The electronic communication may provide a prompt for the user indicating that there is an outstanding feedback request for a particular asset for which the user indicated the desire to provide detailed feedback.

The user may fill out forms on the website providing feedback about the asset using device 110b and post or submit the forms to computer 1020 over communications network 1010. Computer 1020 may store the feedback in storage 1022 and transmit the feedback to the media provider of the asset or sponsor of the asset about which the user provided feedback.

Figure 11:
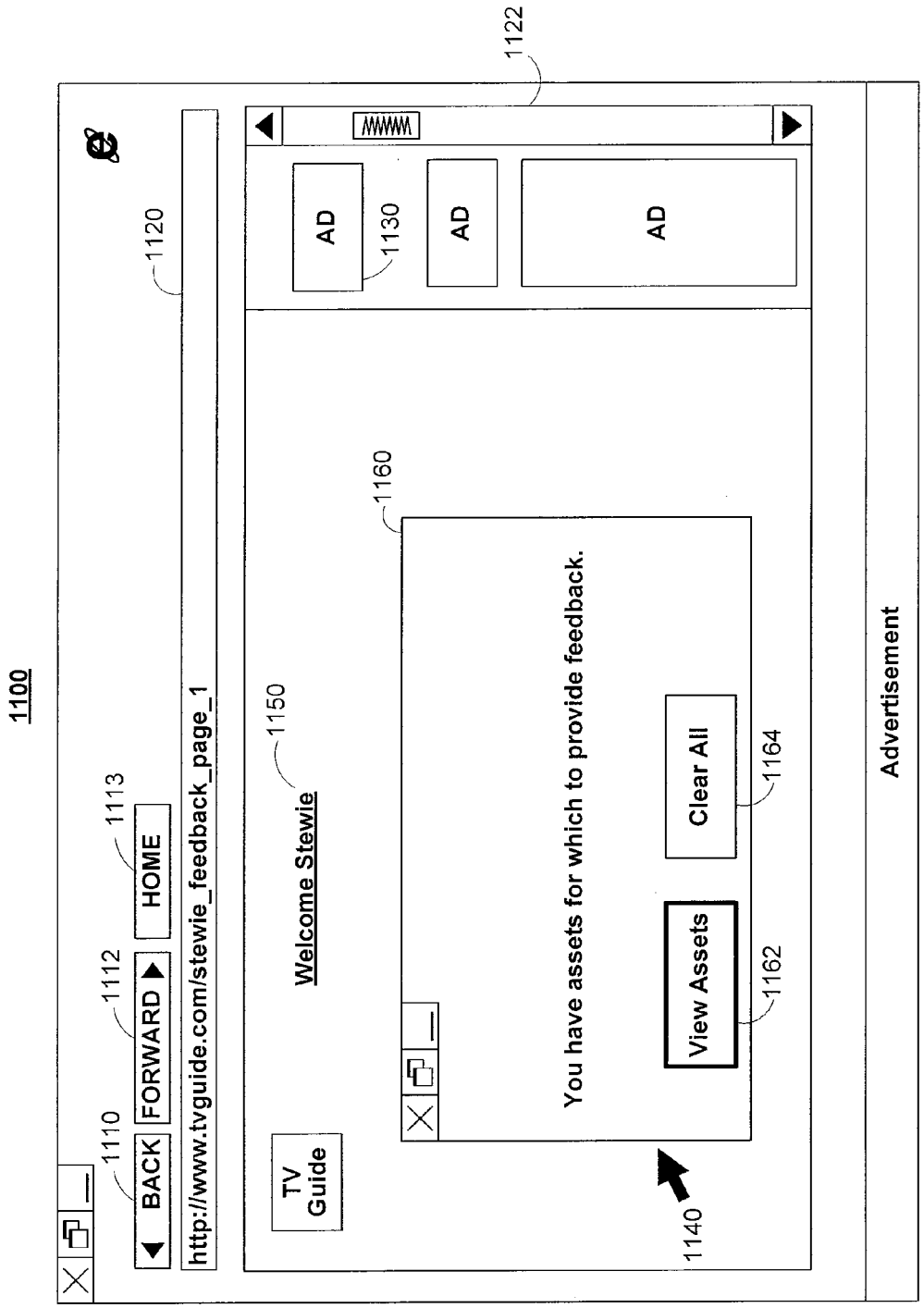
FIGS. 11-13 show illustrative asset feedback website screens in accordance with an embodiment of the present invention.

FIG. 11 shows an illustrative asset feedback website screen 1100 in accordance with an embodiment of the present invention. Screen 1100 includes various browsing options typically available in browsers (e.g., Internet Explorer or Mozilla). In particular, a back option 1110 and forward option 1112 may be provided allowing the user to navigate forward and backwards through website pages. A home page option 1113 may be provided to navigate to the user's home page and an address bar 1120 may be displayed indicating the address of the website the user is browsing. A cursor 1140 may also be provided to select between the various options on the website. Advertisements 1130 may be displayed alongside the webpage and a scroll bar 1122 may allow the user to scroll up/down through the webpage content and/or advertisements 1130.

After the user logs into the website using device 110b (e.g., by way of entering a username and password in a login screen associated with the website), the website may display a user identifier 1150 that may include the name of the user. In response to receiving the login information from device 110b, computer 1020 may determine and retrieve any or all feedback requests from the feedback queue. Device 110b may receive one or all of the feedback requests and provide an indication to the user using feedback prompt 1160 (e.g., a pop-up window or website overlay) informing the user about the feedback request(s) that is/are outstanding.

In some implementations, a cookie (or other suitable file) may be stored on device 110b which includes the user's login information. When the user enters the website, the cookie (or other file) may be retrieved to automatically log the user onto the website and making it unnecessary for the user to type in a username and password. After device 110b automatically logs onto the website, computer 1020 may similarly determine whether any feedback request entries are present in the feedback queue that are associated with the particular user.

Feedback prompt 1160 may include a view assets option 1162 and a clear all option 1164. The user may select view assets option 1162 to get a display of all the outstanding feedback requests and the assets for which the user expressed a desire to provide detailed feedback. It should be understood that instead of providing prompt 1160, the system may automatically display all or one of the assets which were retrieved from the feedback queue and for which the user expressed the desire to provide detailed feedback. Selection of view assets option 1162 may display a window 1210 (FIG. 12) including listing of assets for which the user expressed the desire to provide detailed feedback.

The user may select clear all option 1164 to remove all outstanding feedback requests from the feedback queue. This option may be selected if the user no longer desires to provide detailed feedback for any of the assets for which there exists a feedback request entry in the queue.

Figure 12:
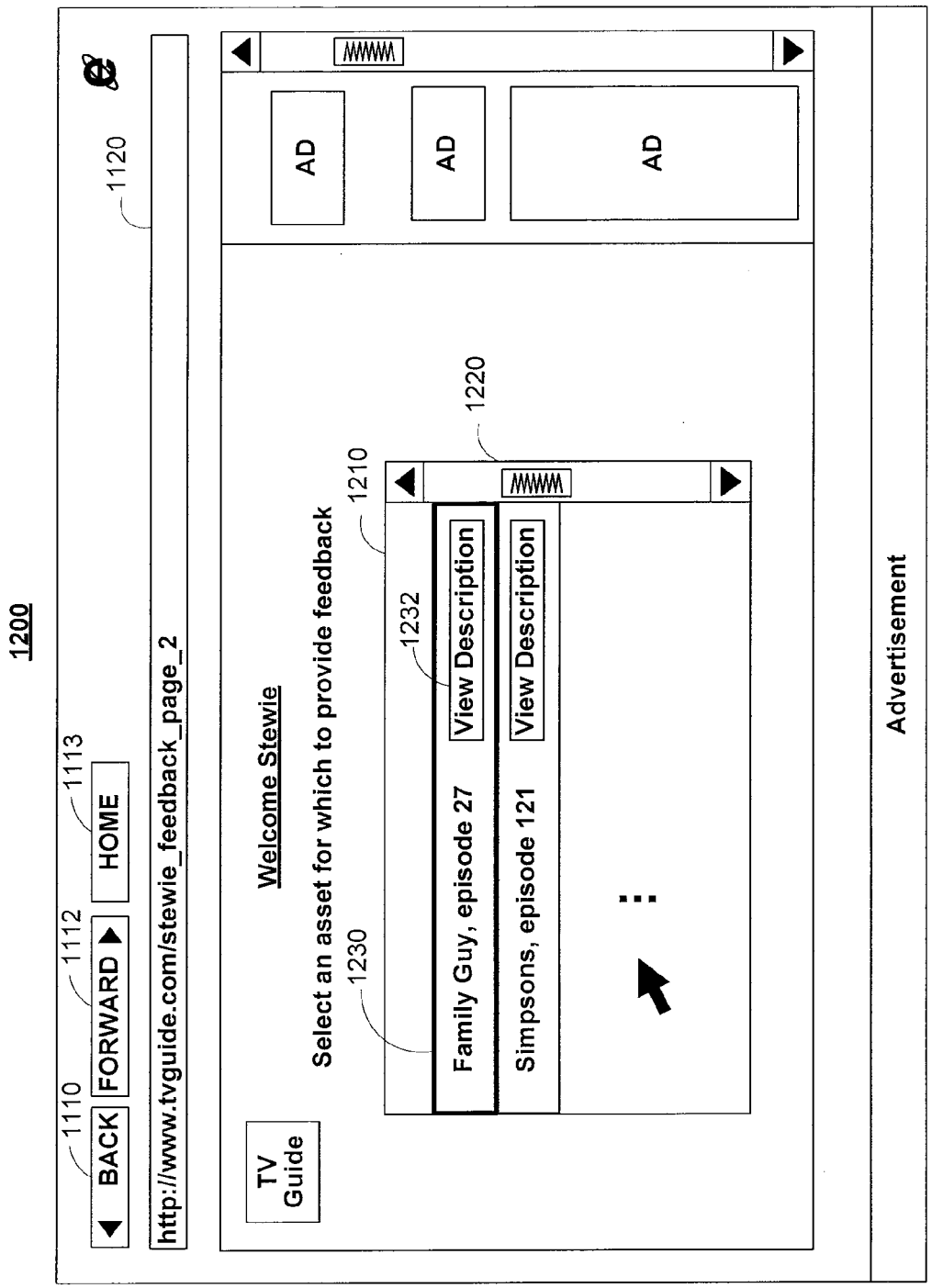

FIG. 12 shows an illustrative asset feedback website screen 1200 in accordance with an embodiment of the present invention. A window 1210 may be displayed after the user selects the option to view assets for which detailed feedback is to be provided. Window 1210 includes a list of assets 1230 which may be generated based on feedback entries retrieved from the feedback queue. A scroll bar 1220 may be provided to allow the user to bring into view other assets for which detailed feedback is to be provided that could fit into window 1210.

Each asset in the list may include a view description option 1232. The user may select view description option 1232 to receive more information about the asset. The values in any of the fields of asset data structure 900 that corresponds to the selected asset may be retrieved from storage and provided (e.g., displayed) to the user in response to the user selection of view description option 1232 (FIG. 9). For example, in response to the user selection of view description option 1232 which is displayed with the asset "Family Guy", the system may retrieve asset data structure 900 associated with the selected asset "Family Guy" and display the value of the description field (e.g., "Stewie goes to jail"). After the user selects a particular asset 1230 for which to provide detailed feedback, the system may navigate the user to website screen 1300 (FIG. 13).

Figure 13:
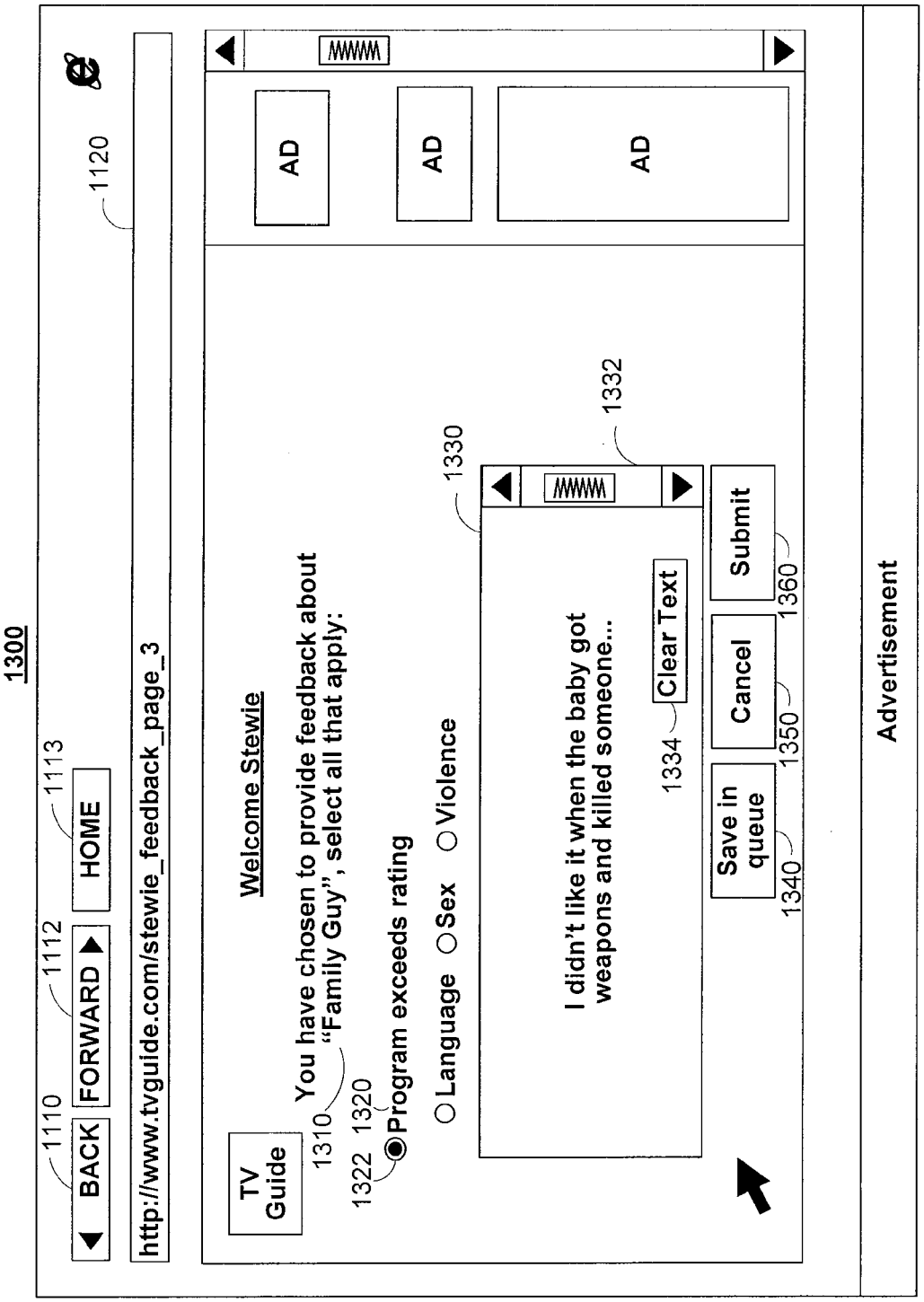

FIG. 13 shows an illustrative asset feedback website screen 1300 in accordance with an embodiment of the present invention. Screen 1300 includes feedback options that the user may select to provide detailed feedback about the selected asset. For example, the user may select asset 1230 (e.g., "Family Guy") from screen 1210 (FIG. 12) and the system may display the title 1310 of the selected asset in screen 1300. Feedback option 1320 may be provided which may include a radio button 1322 that the user can toggle to provide feedback. Feedback options 1320 included in screen 1300 may be inclusive of the feedback options provided in screen 800 (FIG. 8).

Among feedback options 1320, a text box 1330 may be provided. In particular, because the user is not limited by a remote control interface and may have a keyboard, it may be easier for the user to provide detailed comments about the selected asset. The user may insert remarks (feedback) about the asset in the form of text in text box 1330. A scroll bar 1332 may be included when the text inserted extends beyond the size of text box 1330. A clear text option 1334 may be provided to allow the user to erase all of the text inserted into text box 1330 with a single click (or selection) (e.g., by using a mouse) of clear text option 1334.

When the user has completed providing feedback (e.g., by selecting feedback options 1320 and/or inserting text), the user may select submit option 1360 to post the feedback to the website. Selection of submit option 1360 may transmit the feedback to media source 120 and/or advertising source 130 (FIGS. 1 and 10) or sponsors of the asset. Advertising source 130 or sponsors may use the feedback information to continue or withdraw sponsoring/funding the asset and/or network through which the asset is provided. As one example, if a retailer of educational toys is paying for advertising associated with a particular program (e.g., Power Rangers) that consistently gets negative feedback for the program's focus on violence and brain-numbing plotlines, the advertising source 130 may decide to remove the advertiser's advertisements from the particular program.

A cancel option 1350 may be selected to remove the feedback request entry from the feedback queue and not provide detailed feedback about the asset. Selection of cancel option 1350 may navigate the user back to screen 1200 to allow the user to select a different asset from window 1210 for which to provide detailed feedback. The asset associated with title 1310 may be removed from the list provided in window 1210 since the user no longer desires to provide detailed feedback.

Alternatively, the user may select a save in queue option 1340 to save the selected feedback options or inserted text back into the feedback queue. In particular, selection of save in queue option 1340 may store the feedback options selected by the user in the feedback queue to allow the user to finish providing feedback about the asset at a later date/time. For example, when the user logs into the website at a future date/time, computer 1020 may retrieve a feedback request from the feedback queue that includes the previously selected feedback options about the asset. The feedback request associated with the asset may be displayed in window 1210 (FIG. 12). In response to the user selection of the feedback request, the system may navigate the user to screen 1300 and populate the feedback options 1320 including text box 1330 based on the previously stored feedback options. Accordingly, the user may continue to provide feedback about the asset from the point at which the user left off even in the middle of inserting text into text box 1330. In some embodiments, rather than queue feedback requests to a user's profile on a specific website (e.g., Comcast.net) feedback requests may be sent by email or text message to a user at an email address or telephone number or IP address which the user designates. The email or text message may contain all the specifics of the program, the inconsistencies which led to the feedback, as well as a reply address, return telephone number or return IP address where the textual portion of the user's feedback can be sent along with the original information. In some embodiments, this email or text message may contain multiple alternative addresses or telephone numbers that the user may send to (e.g., one for each of the advertisers supporting the program, one for the network provider, and one for the content provider). In some embodiments, the email or text message may contain links to web based feedback forms that will allow the user to enter his textual feedback. In some embodiments, a picture (e.g., a still frame or cover art) or video clip (e.g., a theatrical trailer) that is representative of one or more of the programs is included in an electronic communication concerning the feedback. The user may receive the email or text message on his/her portable email device (e.g., BlackBerry) and may provide textual feedback about the program using the portable email device through the links and/or reply address that may be included in the email communication.

In some implementations, the system may automatically (e.g., after a predetermined time period of, for example, 1 or 2 minutes) save the feedback options selected by the user in feedback queue 1340 (or some other storage in memory). This way, if the user accidentally closes the website (or if the computer shuts down), the user would not lose all the feedback that was selected/provided. In particular, the next time the user logs onto the website, the feedback options may be retrieved from storage and the user may continue to provide feedback from the latest point of storage (e.g., about 1 or 2 minutes before the website was inadvertently or otherwise closed).

Figure 14:
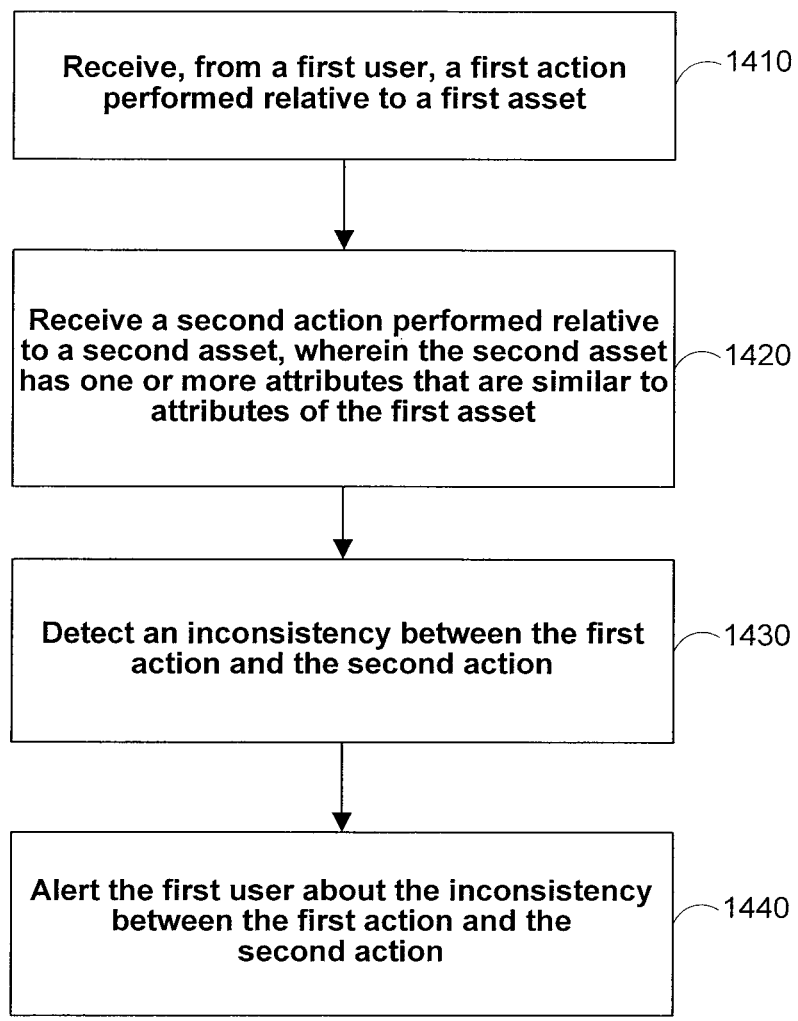
FIG. 14 illustrates a method of alerting a user about inconsistent actions performed relative to assets in accordance with an embodiment of the present invention.

FIG. 14 illustrates a method 1400 of alerting a user about inconsistent actions performed relative to assets in accordance with an embodiment of the present invention. At step 1410, a first action performed relative to a first asset is received from a first user. For example, a user may perform a first action by locking one or more attributes of a first asset. In particular, the user may lock a title attribute of an asset by selecting a title from menu 310 (FIG. 3). Alternatively, the user may perform a first action relative to a first asset by selecting a lock attribute option 540, 550 or 560 from on-screen menu 520 overlaid over the first asset (e.g., displayed with the first asset).

At step 1420, a second action performed relative to a second asset is received, where the second asset has an attribute with a value similar to the value of the corresponding attribute of the first asset. For example, the second action may be an inaction by the user (e.g., the user does not lock the second asset) (FIG. 6). In some scenarios, the second action performed relative to the second asset may be an update to program listings in a program guide which changes the value of an attribute of a particular asset or adds an asset to the program guide (FIG. 7). The system may determine that the first and second assets have similar attributes by comparing fields in the asset data structures associated with the first and second assets.

At step 1430, an inconsistency between the first and second actions is detected. For example, control circuitry 118 may detect a conflict between the first and second actions by determining that the first action locked the first asset and the second asset, that has a value for an attribute that is similar to the value of the corresponding attribute of the first asset, was not locked (FIG. 1). In particular, control circuitry 118 may retrieve one or more attributes from fields in asset data structure 900 associated with the locked first asset. Control circuitry 118 may compare the attributes of the locked first asset to fields in asset data structures 900 associated with other assets (including the second asset) to determine whether the assets have similar attributes. Control circuitry 118 may detect that the first and second actions are inconsistent by determining that the first action locked the first asset while the second action did not lock the second asset.

At step 1440, the first user is alerted about the inconsistency between the first and second actions. For example, conflict alert screen 400, 600 or 700 may be displayed and may include a prompt informing the user about the inconsistency between the first and second actions. In particular, conflict alert screen 600 includes a prompt informing the user that a first asset (e.g., Family Guy) with a particular rating attribute has been locked but a second asset which has a similar rating attribute has not been locked. The user may choose to resolve the inconsistency by locking the second asset, providing feedback about the first/second asset or ignoring the conflict altogether.

Figure 15:
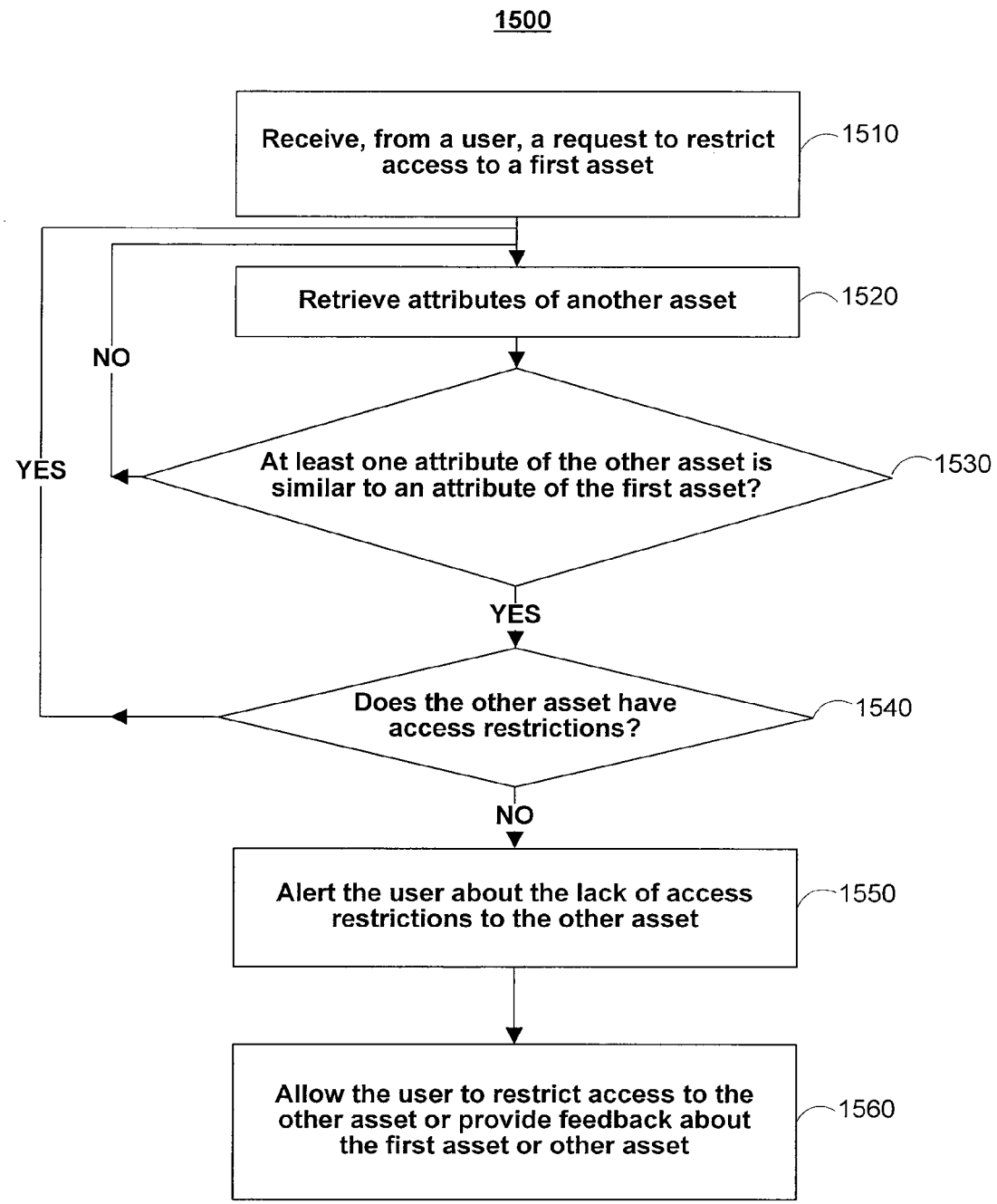
FIG. 15 illustrates a method of restricting access and/or providing feedback about assets in accordance with an embodiment of the present invention.

FIG. 15 illustrates a method 1500 of restricting access and/or providing feedback about assets in accordance with an embodiment of the present invention. At step 1510, a request to restrict access to a first asset is received. For example, the user may restrict access by locking a title attribute of an asset by selecting a title from menu 310 (FIG. 3). Alternatively, the user may restrict access to an asset by selecting a lock attribute option 540, 550 or 560 from on-screen menu 520 overlaid over the first asset (e.g., displayed with the first asset).

At step 1520, attributes of a second asset are retrieved. For example, control circuitry 118 may select an asset (different from the asset which has been restricted at step 1510) and retrieve one or more attributes from fields in asset data structure 900 that is associated with the selected asset and that may be stored in storage device 116 (FIG. 1). The asset data structure may also be retrieved from media source 120 if the data structure is not present in storage device 116.

At step 1530, an attribute of the second asset is compared to an attribute of the first asset to determine whether the attributes are similar. For example, control circuitry 118 may compare the attributes of the first asset which has been restricted to the attributes retrieved at step 1520 that are associated with the second asset. Control circuitry 118 may proceed to step 1540 to determine whether the second asset has access restrictions when at least one of the attributes of the first and second assets are similar. Control circuitry 118 may return to step 1520 to select another asset when none of the attributes of the first and second assets are similar.

At step 1540, a determination is made as to whether the second asset has access restrictions. For example, control circuitry 118 may determine based on a value in one of the fields of the second asset's data structure whether access has been restricted to the second asset. Control circuitry 118 may return to step 1520 to select and retrieve attributes of another asset when the second asset contains access restrictions (e.g., because this may indicate that no inconsistent actions have been performed relative to the first and second assets since both have been restricted). Control circuitry 118 may proceed to step 1550 to alert the user about inconsistent actions if the second asset is determined not to have access restrictions (e.g., is unlocked).

At step 1550, the user is alerted by the lack of access restrictions to the second asset. For example, conflict alert screen 400, 600 or 700 may be displayed and may include a prompt alerting the user that the first asset is locked while the second asset has not been locked. In particular, conflict alert screen 600 includes a prompt alerting the user that a first asset (e.g., Family Guy) with a particular rating attribute has been locked but a second asset which has a similar rating attribute has not been locked.

At step 1560, the user is provided with an option to restrict access to the second asset and/or provide feedback about the first/second asset. For example, the user may choose to resolve the inconsistency or conflict by locking the second asset, providing feedback about the first/second asset or ignoring the conflict altogether. In particular, the user may select lock all assets having the similar attributes option 640 to instruct control circuitry 118 to lock all assets which have the rating attribute of the first asset or a higher rating. Alternatively, the user may select continue with lock option 630 to ignore the alert and just lock the first asset. The user may also select provide feedback about the first asset option 650 to be provided with screen 800 where the user may provide feedback about the first or second asset.

Figure 16:
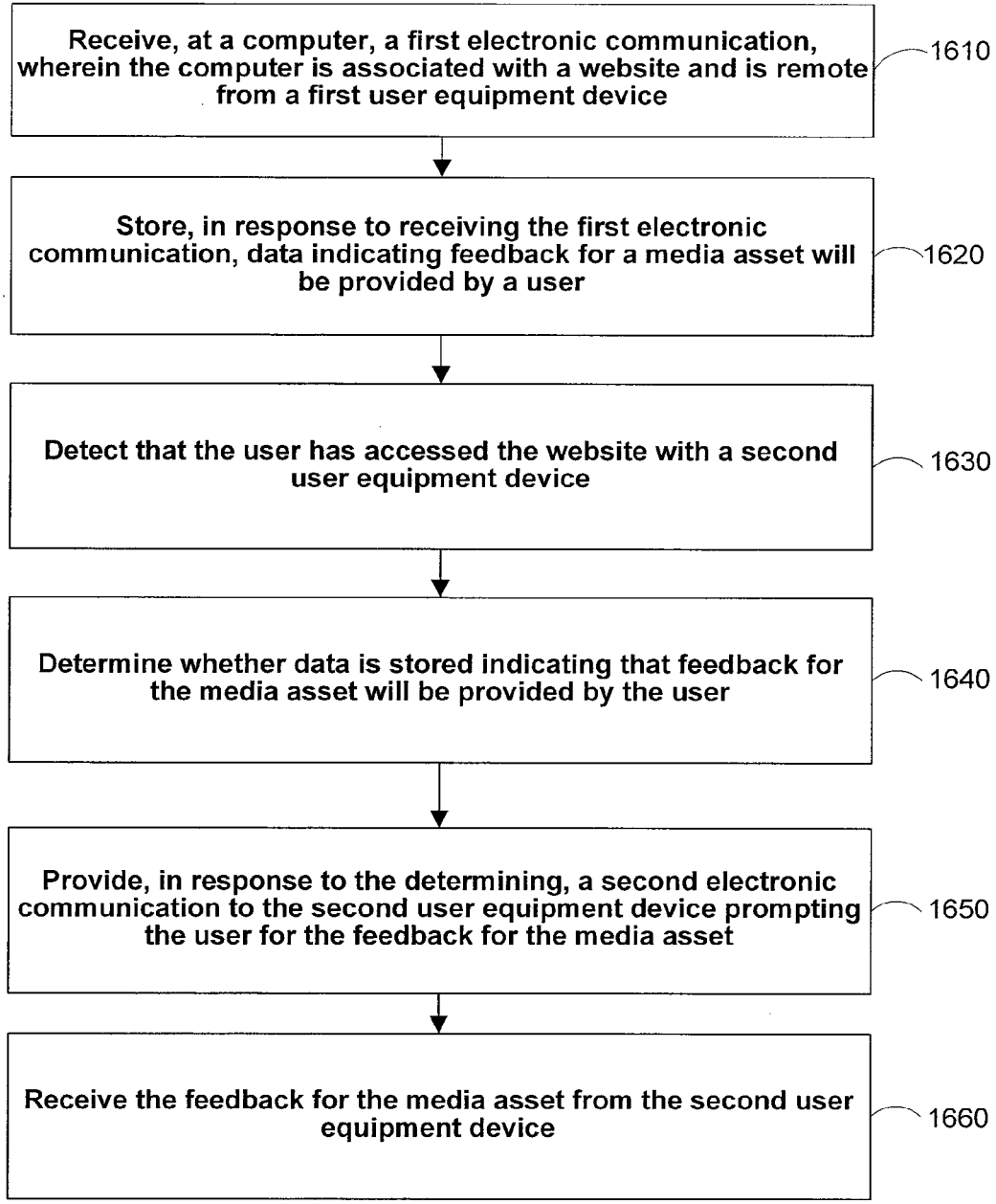
FIG. 16 illustrates a method of providing detailed feedback about an asset through a website in accordance with an embodiment of the present invention.

FIG. 16 illustrates a method 1600 of providing detailed feedback about an asset through a website in accordance with an embodiment of the present invention. At step 1610, a first electronic communication is received at a computer that is associated with a website and is remote from a first user device. For example, in response to the user selecting more feedback option 860 (FIG. 8), user device 110a may transmit a communication (e.g., feedback request) to computer 1020 that includes a user and asset identifiers (FIG. 10). Computer 1020 may host a website which the user is a member of and can access to view assets and provide feedback about the assets. The asset may be an asset about which the user has expressed the desire to provide detailed feedback. The communication may be provided to computer 1020 over communications network 1010.

At step 1620, data indicating feedback for a media asset will later be provided by a user is stored in response to the receipt of the first electronic communication. For example, computer 1020 may store the feedback request received from user device 110a in a feedback queue (or any other type of organizational data structure) in storage 1022.

At step 1630, the system detects that the user has accessed the website with a second user device. For example, the user of user device 110b may log onto the website hosted by computer 1020. In particular, user device 110b may be another computer on which the user may operate a browser and enter the website address of the website hosted by computer 1020. The user may also manually (or automatically) enter a username and password to allow computer 1020 to identify the user and load various options (include feedback requests) unique to the user.

At step 1640, a determination is made as to whether data is stored indicating that feedback for the media asset will be provided by the user. For example, processor 1023 may determine whether the feedback queue in storage 1022 includes any feedback requests associated with the user that is logged into the website. Processor 1023 may retrieve the first feedback request that was entered into the queue or any other request or requests that are stored in the feedback queue.

At step 1650, a second electronic communication is provided to the second user device prompting the user for feedback about the media asset in response to determining that data is stored. For example, user device 110b may receive one or more feedback requests that are retrieved from the feedback queue from computer 1020 and may display a prompt 1160 that indicates to the user that there are assets for which the user expressed the desire to provide feedback (FIG. 11). The user may select a particular asset about which to provide detailed feedback from window 1210 (FIG. 12).

At step 1660, feedback about the media asset is received from the second user device. For example, a feedback form may be displayed in screen 1300 (FIG. 13). The feedback form may allow the user to select between various feedback options 1320 including a text box 1330 to provide feedback about a selected asset. The user may select submit option 1360 to transmit the feedback to media source 120 or any other sponsor or advertiser of the asset (FIG. 1).

The above described embodiments of the present invention are presented for purposes of illustration and not of limitation, and the present invention is limited only by the claims which follow.

What is claimed is:

1. A method for receiving feedback concerning a media asset from a user of a first user equipment device, comprising:
   receiving, at a computer, a first electronic communication, wherein the computer is associated with a website and is remote from the first user equipment device;
   storing, in response to receiving the first electronic communication, data indicating feedback for the media asset will be provided by the user;
   detecting that the user has accessed the website with a second user equipment device;
   determining, in response to the detecting, whether data is stored indicating that feedback for the media asset will be provided by the user;
   in response to the determining;
   providing a second electronic communication to the second user equipment device prompting the user for the feedback for the media asset; and
   receiving the feedback for the media asset from the second user equipment device, wherein the feedback includes information indicating the user was alerted to an inconsistent action performed relative to the media asset.

2. The method of claim 1 wherein storing data indicating feedback for the media asset will be provided by the user comprises adding an entry to a feedback queue, wherein the entry includes information corresponding to the data indicating feedback for the media asset will be provided by the user.

3. The method of claim 1 wherein detecting that the user has accessed the website with the second user equipment device comprises displaying, at the second user equipment device, an option to provide feedback for a media asset, the method further comprising:
   receiving, from the user, a selection of the option to provide feedback.

4. The method of claim 1 wherein determining whether data is stored indicating that feedback for the media asset will be provided by the user comprises:
   determining whether at least one entry has been added to a feedback queue, wherein the at least one entry includes information corresponding to the data indicating feedback for the media asset will be provided by the user; and retrieving the at least one entry from the feedback queue.

5. The method of claim 1 wherein the first electronic communication includes an identifier of the user and an identifier of the media asset.

6. The method of claim 5, wherein the identifier of the media asset includes the title of the media asset.

7. The method of claim 1 wherein the feedback for the media asset is received from the second user equipment device in a textual format.

8. The method of claim 1 wherein the second electronic communication includes a title of the media asset and a feedback field for receiving feedback from the user expressing reasons for approval or disapproval of the media asset.

9. The method of claim 1, wherein the second electronic communication is an email or text message.

10. The method of claim 1, wherein the second electronic communication comprises a picture or video clip that is representative of the media asset.

11. The method of claim 1 wherein prompting the user for the feedback for the media asset comprises displaying an alert for the viewer requesting feedback for the media asset.

12. The method of claim 1 wherein receiving the feedback comprises displaying on the second user equipment device a plurality of feedback options and selecting at least one of the feedback options.

13. The method of claim 12 wherein at least one of the feedback options includes a textual input field for allowing the user to express reasons for approval or disapproval of the media asset.

14. A system for receiving feedback concerning a media asset from a user of a first user equipment device, the system comprising:
    a computer associated with a website and being remote from the first user equipment device comprising processing circuitry configured to:
    receive a first electronic communication;
    store in a memory, in response to receiving the first electronic communication, data indicating feedback for the media asset will be provided by the user;
    detect that the user has accessed the website with a second user equipment device;
    determine, in response to the detecting, whether data is stored in the memory indicating that feedback for the media asset will be provided by the user;
    in response to the determining;
    provide a second electronic communication to the second user equipment device prompting the user for the feedback for the media asset; and
    receive the feedback for the media asset from the second user equipment device, wherein the feedback includes information indicating the user was alerted to an inconsistent action performed relative to the media asset.

15. The system of claim 14 wherein the processing circuitry is further configured to add an entry to a feedback queue in the memory, wherein the entry includes information corresponding to the data indicating feedback for the media asset will be provided by the user.

16. The system of claim 14 wherein the second user equipment device comprises a display device and control circuitry, wherein the control circuitry is configured to display on the display device an option to provide feedback for a media asset and receive, from the user, a selection of the option to provide feedback.

17. The system of claim 14 wherein the processing circuitry is further configured to:
    determine whether at least one entry has been added to a feedback queue in the memory, wherein the at least one entry includes information corresponding to the data indicating feedback for the media asset will be provided by the user; and
    retrieve the at least one entry from the feedback queue.

18. The system of claim 14 wherein the first electronic communication includes an identifier of the user and an identifier of the media asset.

19. The system of claim 18, wherein the identifier of the media asset includes the title of the media asset.

20. The system of claim 14 wherein the feedback for the media asset is received from the second user equipment device in a textual format.

21. The system of claim 14 wherein the second electronic communication includes a title of the media asset and a feedback field for receiving feedback from the user expressing reasons for approval or disapproval of the media asset.

22. The system of claim 14, wherein the second electronic communication is an email or text message.

23. The system of claim 14, wherein the second electronic communication comprises a picture or video clip that is representative of the media asset.

24. The system of claim 14 wherein the second user equipment device comprises a display device and control circuitry configured to display on the display device an alert for the viewer requesting feedback for the media asset.

25. The system of claim 14 the second user equipment device comprises a display device and control circuitry configured to display on the display device a plurality of feedback options and receive a selection of at least one of the feedback options.

26. The system of claim 25 wherein at least one of the feedback options includes a textual input field for allowing the user to express reasons for approval or disapproval of the media asset.

* * * * *

UNITED STATES PATENT AND TRADEMARK OFFICE
CERTIFICATE OF CORRECTION

PATENT NO. : 9,077,934 B2  
APPLICATION NO. : 13/444173  
DATED : July 7, 2015  
INVENTOR(S) : Michael L. Craner Page 1 of 1

It is certified that error appears in the above-identified patent and that said Letters Patent is hereby corrected as shown below:

In the Claims:

Claim number 1, line 14, change "in response to the determining;" to – "in response to the determining:"

Claim number 14, line 16, change "in response to the determining;" to – "in response to the determining:"

Signed and Sealed this
Twelfth Day of January, 2016

Michelle K. Lee
*Director of the United States Patent and Trademark Office*